(12) United States Patent
Hampson et al.

(10) Patent No.: US 11,496,603 B2
(45) Date of Patent: *Nov. 8, 2022

(54) PROVIDING CONTENT BASED ON EVENT RELATED INFORMATION

(71) Applicant: Google LLC, Mountain View, CA (US)

(72) Inventors: Courtney Hampson, Mountain View, CA (US); Jason Robert Richard Sanio, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/843,881

(22) Filed: Apr. 8, 2020

(65) Prior Publication Data

US 2020/0236193 A1 Jul. 23, 2020

Related U.S. Application Data

(63) Continuation of application No. 15/836,726, filed on Dec. 8, 2017, now Pat. No. 10,735,555, which is a
(Continued)

(51) Int. Cl.
*H04L 67/62* (2022.01)
*G06Q 30/02* (2012.01)
(Continued)

(52) U.S. Cl.
CPC .......... *H04L 67/62* (2022.05); *G06F 16/9038* (2019.01); *G06F 16/9535* (2019.01);
(Continued)

(58) Field of Classification Search
CPC ............... G06F 16/9535; G06F 16/285; G06F 16/9038; G06F 16/24578; G06Q 30/0251;
(Continued)

(56) References Cited

U.S. PATENT DOCUMENTS 8,155,630 B2   4/2012   Scott et al.
8,620,735 B2   12/2013  Khoo
(Continued)

OTHER PUBLICATIONS

"10 Tips to Improve the Performance of Google Product Listing Ads", Foghorn Labs, retrieved Mar. 18, 2013 from URL: http://www.foghornlabs.com/2012/11/21/product-listing-ads-best-practices/ (5 pages).
(Continued)

*Primary Examiner* — Lesa M Kennedy
(74) *Attorney, Agent, or Firm* — Marshall, Gerstein & Borun LLP

(57) ABSTRACT

Systems and methods for selecting content based on an event associated with a device identifier are provided. One or more processors can receive a request to serve content. The processors can identify a device identifier associated with the request. The processors can determine, from the device identifier, an event for which to serve content. The processors can determine, from the request, a length of time between a time the request to serve content is received and a time at which the event is scheduled to occur. The processors can select, based on the determined length of time and event parameters associated with the event, content for display and provide the selected content for display at a computing device associated with the device identifier.

18 Claims, 11 Drawing Sheets

Related U.S. Application Data continuation of application No. 14/450,212, filed on Aug. 2, 2014, now Pat. No. 9,843,649.

(51) Int. Cl.
*G06F 16/9535* (2019.01)
*G06F 16/9038* (2019.01)

(52) U.S. Cl.
CPC ..... *G06Q 30/0251* (2013.01); *G06Q 30/0264* (2013.01); *G06Q 30/0252* (2013.01)

(58) Field of Classification Search
CPC ............ G06Q 30/0252; G06Q 30/0264; H04L 67/22; H04L 67/62
See application file for complete search history.

(56) References Cited

U.S. PATENT DOCUMENTS

| | | | |
|---|---|---|---|
| 8,626,575 | B1 | 1/2014 | Gong |
| 8,839,140 | B2 | 9/2014 | Nassar |
| 8,868,692 | B1 | 10/2014 | Khanna et al. |
| 2002/0013729 | A1 | 1/2002 | Kida |
| 2006/0224583 | A1 | 10/2006 | Fikes et al. |
| 2007/0055561 | A1 | 3/2007 | Perrella et al. |
| 2007/0260989 | A1 | 11/2007 | Vakil et al. |
| 2008/0027921 | A1 | 1/2008 | Chandrasekar et al. |
| 2008/0201647 | A1 | 8/2008 | Lagerstedt et al. |
| 2009/0012841 | A1 | 1/2009 | Saft et al. |
| 2009/0040875 | A1 | 2/2009 | Buzescu et al. |
| 2009/0177476 | A1 | 7/2009 | Darrell et al. |
| 2009/0183208 | A1 | 7/2009 | Christensen et al. |
| 2009/0210351 | A1 | 8/2009 | Bush et al. |
| 2009/0216607 | A1 | 8/2009 | Bartholomew |
| 2010/0042403 | A1 | 2/2010 | Chandrasekar et al. |
| 2010/0222033 | A1* | 9/2010 | Scott ................... H04M 3/5322 455/414.1 |
| 2012/0084286 | A1 | 4/2012 | Hubner et al. |
| 2012/0131139 | A1 | 5/2012 | Siripurapu et al. |
| 2012/0233531 | A1 | 9/2012 | Ma et al. |
| 2012/0278142 | A1 | 11/2012 | Li |
| 2013/0124449 | A1 | 5/2013 | Pinckney et al. |
| 2013/0332527 | A1 | 12/2013 | Du et al. |
| 2015/0339575 | A1* | 11/2015 | Streit ................... G06F 16/9535 706/48 |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0132019 | A1 | 5/2017 | Karashchuk et al. |
| 2017/0358301 | A1 | 12/2017 | Raitio et al. |

OTHER PUBLICATIONS

"'Dolphin' attacks fool Amazon, Google voice assistants", BBC News, Sep. 7, 2017 (8 pages).
"Doodle Launches New Online Advertising Format Called Calendar Ads",2 pages, Oct. 18, 2011, Doodle Blog (2 pages).
"Products Feed Specification", Google Merchant Center Help, Google, Inc., retrieved Mar. 18, 2013 from URL: http://www.support.google.com/merchants/bin/answer.py?hl=en&answer=188494#US (6 pages).
"Supported File Formats", Google Merchant Center Help, Google, Inc., retrieved Mar. 18, 2013 from URL: http://www.support.google.com/merchants/bin/answer.py?hl=en&answer=160567 (1 page).
"Walmart and Google to offer voice-enabled shopping", BBC News, Aug. 23, 2017 (10 pages).
Abrams, Brad, "Help users find, interact & re-engage with your app on the Google Assistant", Google Developers Blog, Nov. 15, 2017 (16 pages).
Albrecht, Chris, "Alexa, How Can You Be Used in Restaurants?", The Spoon, Dec. 10, 2017 (6 pages).
Amazon, "Echo Look | Hands-Free Camera and Style Assistant", retrieved Aug. 22, 2017 from URL: https://www.amazon.com/gp/product/B0186JAEWK?ref%5F=cm%5Fsw%5Fr%5Ffa%5Fdp%5Ft2%5FC5oazbJTKCB18&pldnSite=1 (7 pages).
Barr, Jeff, "AWS DeepLens—Get Hands-On Experience with Deep Learning With Our New Video Camera", AWS News Blog, Nov. 29, 2017 (11 pages).
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018 (6 pages).
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, Cohen, "Apple patent filing reveals potential whispering Siri functionality", Techspot, Dec. 14, 2017 (4 pages).
Collins, et al., "Can Twitter Save Itself?", CNET, Apr. 26, 2017, retrieved Aug. 22, 2017 from URL: https://www.cnet.com/news/twitter-q1-2017-earnings/ (3 pages).
Crist, Ry, "Logitech Harmony's Alexa skill just got a whole lot better", CNET, Jul. 13, 2017 (2 pages).
Estes, Adam Clark, "Amazon's Newest Gadget is a Tablet That's Also an Echo", Gizmodo, Sep. 19, 2017 (3 pages).
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", CNET, May 20, 2017, retrieved Aug. 22, 2017 from URL: https://www.cnet.com/news/google-assistant-is-spreading-but-google-still-needs-a-dot/ (7 pages).
Gebhart, Andrew, "Google Home to the Amazon Echo: 'Anything you can do . . . '", CNET, May 18, 2017 (7 pages).
Gibbs, Samuel, "Your Facebook Messenger app is about to be filled with ads", The Guardian, Jul. 12, 2017, retrieved Aug. 22, 2017 from URL: https://www.theguardian.com/technology/2017/jul/12/facebook-messenger-app-adverts (3 pages).
Golgowski, Nina, "This Burger King Ad is Trying to Control Your Google Home Device", HuffPost, Apr. 12, 2017 (7 pages).
Google Developers, "GoogleAssistant SDK", retrieved Aug. 22, 2017 from URL: https://developers.google.com/assistant/sdk/ (4 pages).
Gurman, et al., "Apple is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, Brian, "Amazon Alexa devices can finally tell voices apart", TechCrunch, Oct. 11, 2017 (6 pages).
Johnston, Lisa, "Amazon Whirlwind: New Echo, Plus, Spot, Connect, Fire TV Take the Stage", Twice, Sep. 27, 2017 (10 pages).
Kelion, Leo, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, Swapna, "Jim Beam's smart decanter will pour you a shot when you ask", engadget, Nov. 29, 2017 (3 pages).
Lacy, Lisa, "Improving search and advertising are the next frontiers for voice-activated devices", TechCrunch, Dec. 20, 2017 (13 pages).
Larson, Selena, "Google Home now recognizes your individual voice", CNN Money, San Francisco, California, Apr. 20, 2017 (3 pages).
Lee, Dave, Take Two for Samsung's troubled Bixby assistant, BBC News, Oct. 19, 2017 (6 pages).
Lee, Dave, "The five big announcements from Google I/O", BBC News, May 18, 2017 (9 pages).

(56) References Cited

OTHER PUBLICATIONS

Lund, Pamela, "Mastering Google Product Feeds and Product Listing Ads—Part 1", retrieved Dec. 28, 2013 from URL: http://www.blueglass.com/blog/mastering-google-product-feeds-and-product-listing-ads-part-1/#comments (17 pages).
Nieva, Richard, "Google Home and eBay can tell you how much that's worth", CNET, Mar. 8, 2017 (3 pages).
Non-Final Office Action for U.S. Appl. No. 14/450,212 dated Apr. 12, 2016 (28 pages).
Non-Final Office Action for U.S. Appl. No. 14/450,213 dated Dec. 29, 2016 (11 pages).
Non-Final Office Action for U.S. Appl. No. 14/450,214 dated Jan. 12, 2018 (6 pages).
Non-Final Office Action for U.S. Appl. No. 14/450,214 dated Jun. 11, 2018 (5 pages).
Non-Final Office Action for U.S. Appl. No. 14/450,214 dated Sep. 12, 2017 (8 pages).
Non-Final Office Action for U.S. Appl. No. 15/716,057 dated Sep. 9, 2019 (8 pages).
Non-Final Office Action for U.S. Appl. No. 15/833,794 dated May 9, 2018 (9 pages).
Non-Final Office Action for U.S. Appl. No. 15/836,726 dated Oct. 2, 2019 (10 pages).
Non-Final Office Action for U.S. Appl. No. 16/289,372 dated Oct. 11, 2019 (12 pages).
Notice of Allowance for U.S. Appl. No. 14/450,212 dated Aug. 11, 2017 (8 pages).
Notice of Allowance for U.S. Appl. No. 14/450,212 dated Dec. 14, 2016 (8 pages).
Notice of Allowance for U.S. Appl. No. 14/450,212 dated Sep. 23, 2016 (9 pages).
Notice of Allowance for U.S. Appl. No. 14/450,213 dated Jun. 2, 2017 (9 pages).
Notice of Allowance for U.S. Appl. No. 14/450,214 dated Feb. 28, 2018 (5 pages).
Notice of Allowance for U.S. Appl. No. 14/450,214 dated Oct. 29, 2018 (5 pages).
Notice of Allowance for U.S. Appl. No. 15/716,057 dated Jan. 8, 2020 (9 pages).
Notice of Allowance for U.S. Appl. No. 15/833,794 dated Oct. 24, 2018 (8 pages).
Notice of Allowance for U.S. Appl. No. 15/836,726 dated Dec. 5, 2019 (8 pages).
Notice of Allowance for U.S. Appl. No. 16/289,372 dated Feb. 3, 2020 (8 pages).
Novet, et al., "Amazon is getting ready to bring Alexa to work", CNBC, Nov. 29, 2017 (4 pages).
Palladino, Valentina, "Garmin teamed up with Amazon to make a tiny Echo Dot for your car", ars Technica, Oct. 17, 2017 (2 pages).
Perez, Sarah, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, Ramona, "'I'm sorry to hear that': Why training Siri to be a therapist won't be easy", CBC News, Sep. 24, 2017 (3 pages).
Purcher, Jack, "Apple Patent Reveals a New Security Feature Coming to Siri", Patently Apple, Apr. 4, 2017, reprinted from http://www.patentlyapple.com/patently-apple/2017/04/apple-patent-reveals-a-new-security-feature-coming-to-siri.html (6 pages).
Purcher, Jack, "The Patent behind Google Home's new Feature of Understanding Different Voices in the Home Surfaced Today", Patently Mobile, Apr. 20, 2017, reprinted from http://www.patentlymobile.com/2017/04/the-patent-behind-google-homes-new-feature-of-understanding-different-voices-in-the-home-surfaced-today.html (3 pages).
Purcher, Jack, "Today Google Home's Virtual Assistant can learn its Owner's voice for Security Reasons like Apple's Patent Pending Idea", Patently Apple, Apr. 20, 2017 (4 pages).
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", CNET, Feb. 13, 2017 (9 pages).
Siegal, Daniel, "IP Attys Load Up Apps' Legal Challenges at 'Silicon Beach'", Law360, Los Angeles, California, Feb. 2, 2017 (4 pages).
Willens, Max, "For publishers, Amazon Alexa holds promise but not much money (yet)", Digiday, Jul. 6, 2017 (6 pages).
Non-Final Office Action for U.S. Appl. No. 16/868,003 dated Apr. 19, 2021 (34 pages).

\* cited by examiner

Content Serving Opportunity Log — 360

| Content Serving Opportunity (362) | Event ID (364) | Event Category (366) | Keyword Cluster (368) | Content ID (370) | Length of Time (days) (372) | Convert? (374) | Profile Identifier (376) |
|---|---|---|---|---|---|---|---|
| CS1 | 101 | Atlantis | Swimwear | 1231 | 11 | No | 7297 |
| CS2 | 542 | Superbowl | HDTV | 3222 | 12 | Yes | 8145 |
| CS3 | 242 | Atlantis | Travel | 7654 | 14 | Yes | 9745 |
| CS4 | 715 | Atlantis | Swimwear | 4565 | 4 | Yes | 1254 |
| CS5 | 774 | Atlantis | Travel | 2311 | 2 | No | 6353 |
| CS6 | 658 | Superbowl | Sports apparel | 9877 | 10 | No | 8044 |
| CS7 | 277 | Superbowl | Sports apparel | 7788 | 3 | Yes | 2050 |

PROVIDING CONTENT BASED ON EVENT RELATED INFORMATION

CROSS-REFERENCES TO RELATED APPLICATIONS

This application claims the benefit of priority under 35 U.S.C. § 120 as a continuation of U.S. patent application Ser. No. 15/836,726, which claims the benefit of priority under 35 U.S.C. § 120 as a continuation of U.S. patent application Ser. No. 14/450,212, filed Aug. 2, 2014, now issued as U.S. Pat. No. 9,843,649, each of which are incorporated herein by reference in their entirety.

BACKGROUND

Content may be served on information resources, such as web pages. Such content may be related to the information resource.

SUMMARY

At least one aspect is directed to a method for creating a data structure that includes a plurality of relevancy scores, each indicating a level of relevancy of a keyword cluster related to an event category for a given time period relative to an event of the event category. One or more processors identify a calendar event associated with a device identifier. The processors determine event parameters of the identified calendar event. The processors determine, from the event parameters, a plurality of keyword clusters associated with the event parameters for serving content to a computing device associated with the device identifier. The processors generate a relevancy score for each of the plurality of keyword clusters over a plurality of time periods relative to the event. The relevancy score of a first subset of the plurality of keyword clusters is higher during a first time period than a second time period and the relevancy score of a second subset of the plurality of keyword clusters is higher during the second time period than the first time period. The processors create, for the event, a data structure including the plurality of keyword clusters and the generated relevancy scores for each of the plurality of keyword clusters over the plurality of time periods relative to the event. The processors then store, to a memory, the created data structure. The processors can receive a request to serve content on the computing device associated with the device identifier. The processors can then determine a time period between a time at which the request was received and a time at which the calendar event is scheduled. The processors can then identify, from the stored data structure, a keyword cluster based on the relevancy score of the keyword cluster for the determined time period and an event category to which the identified calendar event belongs.

In some implementations, the processors can select a content item based on the identified keyword cluster and provide, in response to the request, the selected content item for display at the computing device associated with the device identifier. In some implementations, determining, from the event parameters, a plurality of keyword clusters associated with the event parameters for serving content to a computing device associated with the device identifier, includes identifying, from the event parameters, an event category to which the event corresponds and identifying the plurality of keywords associated with the event category. In some implementations, identifying, from the event parameters, an event category to which the event corresponds includes selecting the event category from a list of predetermined event categories, each associated with one or more keyword clusters. In some implementations, identifying an event associated with a device identifier includes identifying the event from a calendar of the device identifier.

In some implementations, determining event parameters of the identified event includes determining a time at which the event is scheduled, determining a location at which the event is scheduled and determining a type of event. In some implementations, determining event parameters of the identified event further includes determining information related to attendees possibly attending the event.

In some implementations, determining, from the event parameters, a plurality of keyword clusters associated with the event parameters on which one or more content providers bid to serve content to a computing device associated with the device identifier includes performing, in a database, a lookup for keyword clusters based on the event parameters.

In some implementations, generating a relevancy score for each of the plurality of keyword clusters over a plurality of time periods relative to the event includes determining, from historical data, performance of content associated with the keyword cluster across each of a plurality of time periods relative to events similar to the event associated with the device identifier.

In some implementations, determining, from historical data, performance of content associated with the keyword cluster across each of a plurality of time periods relative to events similar to the event associated with the device identifier includes identifying, from historical data, a content item selected for display that is associated with a particular keyword cluster of the plurality of keyword clusters, determining, for at least one device identifier to which the content item was served, an event corresponding to which the keyword cluster was determined, determining a time associated with the event, determining a time period from the event at which the content item was served and determining if any action was taken responsive to providing the content for display.

According to another aspect, a system for creating a data structure that includes a plurality of relevancy scores, each indicating a level of relevancy of a keyword cluster related to an event category for a given time period relative to the event is described. The system includes a memory and one or more processors. The one or more processors can be configured to identify an event associated with a device identifier. The processors can determine event parameters of the identified event. The processors can determine, from the event parameters, a plurality of keyword clusters associated with the event parameters for serving content to a computing device associated with the device identifier. The processors can generate a relevancy score for each of the plurality of keyword clusters over a plurality of time periods relative to the event. The relevancy score of a first subset of the plurality of keyword clusters is higher during a first time period than a second time period and the relevancy score of a second subset of the plurality of keyword clusters is higher during the second time period than the first time period. The processors can create, for the event, a data structure including the plurality of keyword clusters and the generated relevancy scores for each of the plurality of keyword clusters over the plurality of time periods relative to the event. The processors can then store, to a memory, the created data structure. The processors can receive a request to serve content on the computing device associated with the device identifier. The processors can then determine a time period between a time at which the request was received and a time at which the calendar event is scheduled. The processors can then identify, from the stored data structure, a keyword cluster based on the relevancy score of the keyword cluster for the determined time period and an event category to which the identified calendar event belongs.

According to another aspect, a computer-readable storage medium has computer-executable instructions, which when executed by processors, cause the processors to identify an event associated with a device identifier. The processors can be caused to determine event parameters of the identified event. The processors can be caused to determine, from the event parameters, a plurality of keyword clusters associated with the event parameters for serving content to a computing device associated with the device identifier. The processors can be caused to generate a relevancy score for each of the plurality of keyword clusters over a plurality of time periods relative to the event. The relevancy score of a first subset of the plurality of keyword clusters is higher during a first time period than a second time period and the relevancy score of a second subset of the plurality of keyword clusters is higher during the second time period than the first time period. The computer can be caused to create, for the event, a data structure including the plurality of keyword clusters and the generated relevancy scores for each of the plurality of keyword clusters over the plurality of time periods relative to the event. The processors can be caused to then store, to a memory, the created data structure. The processors can be caused to receive a request to serve content on the computing device associated with the device identifier. The processors can be caused to determine a time period between a time at which the request was received and a time at which the calendar event is scheduled. The processors can be caused to identify, from the stored data structure, a keyword cluster based on the relevancy score of the keyword cluster for the determined time period and an event category to which the identified calendar event belongs.

According to another aspect, a method for selecting content based on a calendar event associated with a device identifier is provided. One or more processors can receive a request to serve third-party content at a computing device. The processors can identify a device identifier associated with the computing device. The processors can determine, from the device identifier, a calendar event for which to serve content. The processors can determine, from the request, a length of time between a time the request to serve content is received and a time at which the calendar event is scheduled to occur. The processors can select, based on the determined length of time and event parameters associated with the calendar event, content for display and provide the selected content for display at the computing device associated with the device identifier.

In some implementations, the processors can determine one or more event parameters associated with the calendar event. To do so, the processors can determine the time at which the event is scheduled to occur, determine a location at which the calendar event is scheduled; and determine a type of event. In some implementations, determining, from the request, the length of time includes determining a time at which the request to serve content is received.

In some implementations, the processors can determine, from the event parameters, a plurality of keyword clusters and select, from the plurality of keywords, a keyword cluster having a highest relevancy score corresponding to the determined length of time.

In some implementations, the event parameters include an event category, an event title, an event description, an event size, and an event location.

In some implementations, the processors can maintain a data structure including a plurality of keyword clusters associated with one or more event parameters and a relevancy score corresponding to a plurality of time periods. Each time period is based on a length of time associated with a time at which the event is scheduled to occur.

In some implementations, selecting, based on the determined length of time and event parameters associated with the event, content for display includes determining, based on the determined length of time, a relevancy score for each of a plurality of keyword clusters associated with the event parameters, determining, from the plurality of keyword clusters, the keyword cluster with the highest relevancy score and selecting, for display, content related to the keyword cluster with the highest relevancy score.

According to another aspect, a system for selecting content based on a calendar event associated with a device identifier is described. The system includes a memory and one or more processors. The one or more processors can be configured to receive a request to serve third-party content at a computing device. The processors can identify a device identifier associated with the computing device. The processors can determine, from the device identifier, a calendar event for which to serve content. The processors can determine, from the request, a length of time between a time the request to serve content is received and a time at which the calendar event is scheduled to occur. The processors can select, based on the determined length of time and event parameters associated with the calendar event, content for display and provide the selected content for display at the computing device associated with the device identifier.

According to another aspect, a computer-readable storage medium has computer-executable instructions, which when executed by one or more processors, cause the processors to receive a request to serve third-party content at a computing device. The processors can be caused to identify a device identifier associated with the computing device. The processors can be caused to determine, from the device identifier, a calendar event for which to serve content. The processors can be caused to determine, from the request, a length of time between a time the request to serve content is received and a time at which the calendar event is scheduled to occur. The processors can be caused to select, based on the determined length of time and event parameters associated with the calendar event, content for display and provide the selected content for display at the computing device associated with the device identifier.

According to another aspect, a method for adjusting a relevancy score of a keyword cluster-time period-event category combination is provided. One or more processors can identify an event category associated with one or more relevancy scores. The processors can identify a plurality of content serving opportunities associated with the event category in which content served in the content serving opportunity is selected based on a keyword cluster associated with the event category. The processors can determine, for each of the identified content serving opportunities, an event for which content was served in the content serving opportunity. The processors can identify, for each event for which content was served in the content serving opportunity, a time period corresponding to a length of time between a time the content of the content serving opportunity was provided for display and a time at which the event was scheduled to occur. The processors can determine, for each of the identified content serving opportunities, a keyword cluster that effected a selection of the content provided for display. The processors can identify, from the plurality of content serving opportunities, a subset of content serving opportunities. Each of the subset of content serving opportunities corresponds to the identified event category, a particular keyword cluster and a particular time period. The processors can determine, for each of the subset of content serving opportunities, a performance of the content associated with the subset of content serving opportunities that is provided for display. The processors can then adjust a relevancy score of the keyword cluster—time period—event category combination based on the performance of the content of the subset of content serving opportunities. In some implementations, the processors can then store the adjusted relevancy score of the keyword cluster—time period—event category combination in a memory. The processors can select, for display, content corresponding to the keyword cluster based on the adjusted relevancy score of the keyword cluster—time period—event category combination.

In some implementations, identifying the plurality of content serving opportunities includes identifying the plurality of content serving opportunities from a content serving opportunity log. The content serving opportunities log includes a plurality of entries, each entry corresponding to a content serving opportunity, each entry identifying a keyword cluster and information related to a performance of a content item associated with the content serving opportunity.

In some implementations, determining, for each of the subset of content serving opportunities, a performance of the content associated with the subset of content serving opportunities that is provided for display includes determining that a converting action is performed on the content item.

In some implementations, adjusting the relevancy score of a keyword cluster—time period—event category combination based on the performance of the content of the subset of content serving opportunities includes increasing a relevancy score of the keyword cluster—time period—event category combination responsive to determining that the conversion rate of content items associated with the subset of content serving opportunities has increased.

In some implementations, adjusting the relevancy score of a keyword cluster—time period—event category combination based on the performance of the content of the subset of content serving opportunities includes decreasing a relevancy score of the keyword cluster—time period—event category combination responsive to determining that the conversion rate of content items associated with the subset of content serving opportunities has lowered.

In some implementations, the processors can determining that the number of content serving opportunities for the keyword cluster—time period—event category combination has exceeded a threshold, compute the relevancy score of the keyword cluster—time period—event category combination and adjust the relevancy score of the plurality of keyword cluster—time period—event category combinations.

In some implementations, the processors can identify, for an event category, a volume of search queries related to the keyword cluster occurring during the time period associated with the keyword cluster—time period—event category combination, determine that the volume of search queries is larger than an expected volume of search queries and increase the relevancy score of the keyword cluster—time period—event category combination based on the volume of search queries.

According to another aspect, a system for adjusting a relevancy score of a keyword cluster-time period-event category combination is provided. The system includes a memory and one or more processors. The one or more processors can be configured to identify an event category associated with one or more relevancy scores. The processors can identify, from a content serving opportunity log, a plurality of content serving opportunities associated with the event category in which content served in the content serving opportunity is selected based on a keyword cluster associated with the event category. The processors can determine, for each of the identified content serving opportunities, an event for which content was served in the content serving opportunity. The processors can identify, for each event for which content was served in the content serving opportunity, a time period corresponding to a length of time between a time the content of the content serving opportunity was provided for display and a time at which the event was scheduled to occur. The processors can determine, for each of the identified content serving opportunities, a keyword cluster that effected a selection of the content provided for display. The processors can identify, from the plurality of content serving opportunities, a subset of content serving opportunities. Each of the subset of content serving opportunities corresponds to the identified event category, a particular keyword cluster and a particular time period. The processors can determine, for each of the subset of content serving opportunities, a performance of the content associated with the subset of content serving opportunities that is provided for display. The processors can then adjust a relevancy score of the keyword cluster—time period—event category combination based on the performance of the content of the subset of content serving opportunities. In some implementations, the processors can then store the adjusted relevancy score of the keyword cluster—time period—event category combination in a memory. The processors can select, for display, content corresponding to the keyword cluster based on the adjusted relevancy score of the keyword cluster—time period—event category combination.

According to another aspect, a computer-readable storage medium has computer-executable instructions, which when executed by a computer, cause the computer to identify an event category associated with one or more relevancy scores. The computer can be caused to identify, from a content serving opportunity log, a plurality of content serving opportunities associated with the event category in which content served in the content serving opportunity is selected based on a keyword cluster associated with the event category. The computer can be caused to determine, for each of the identified content serving opportunities, an event for which content was served in the content serving opportunity. The computer can be caused to identify, for each event for which content was served in the content serving opportunity, a time period corresponding to a length of time between a time the content of the content serving opportunity was provided for display and a time at which the event was scheduled to occur. The computer can be caused to determine, for each of the identified content serving opportunities, a keyword cluster that effected a selection of the content provided for display. The computer can be caused to identify, from the plurality of content serving opportunities, a subset of content serving opportunities. Each of the subset of content serving opportunities corresponds to the identified event category, a particular keyword cluster and a particular time period. The computer can be caused to determine, for each of the subset of content serving opportunities, a performance of the content associated with the subset of content serving opportunities that is provided for display. The computer can be caused to then adjust a relevancy score of the keyword cluster—time period—event category combination based on the performance of the content of the subset of content serving opportunities. In some implementations, the computer can be caused to then store the adjusted relevancy score of the keyword cluster—time period—event category combination in a memory. The processors can be caused to select, for display, content corresponding to the keyword cluster based on the adjusted relevancy score of the keyword cluster—time period—event category combination.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
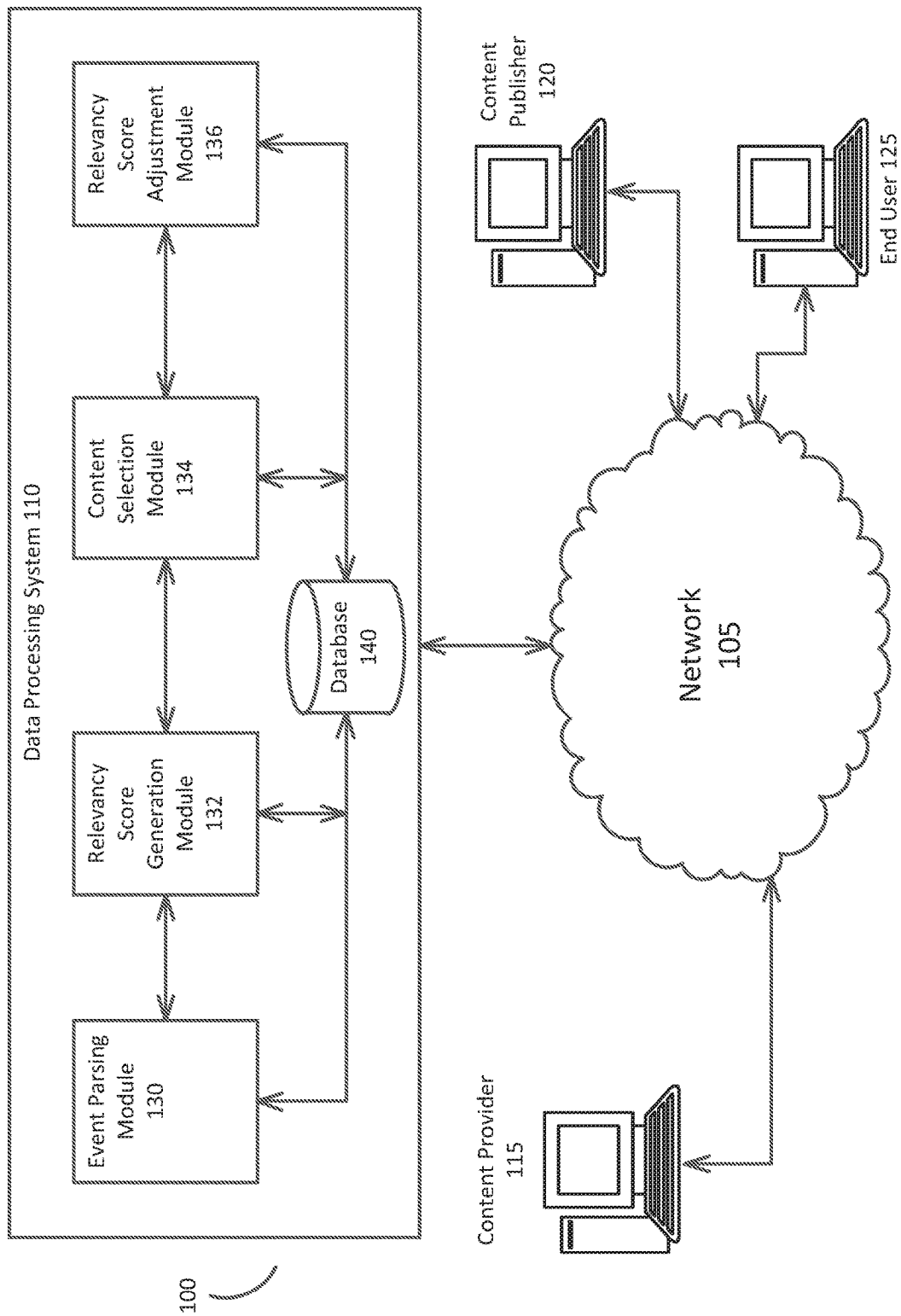
FIG. 1 is a block diagram depicting one implementation of an environment for selecting content for display based on event related information of an event and a time duration from the event, according to an illustrative implementation.

Following below are more detailed descriptions of various concepts related to, and implementations of, methods, apparatus, and systems for providing content for display based on event related information of an event and a time duration from the event. In one aspect of the present disclosure, methods, apparatus and systems for creating a data structure that includes a plurality of relevancy scores, each indicating a level of relevancy of a keyword cluster related to an event for various time periods corresponding to different lengths of time from the event. In another aspect, methods, apparatus and systems for selecting third-party content for a device based on calendar events of a user associated with the device and a length of time between the time third-party content is to be served and the time at which the event is scheduled to occur are described. In yet another aspect, methods, apparatus and systems for adjusting a relevancy score of a keyword cluster-event pair based on a time period duration from an event are described. The various concepts introduced above and discussed in greater detail below may be implemented in any of numerous ways, as the described concepts are not limited to any particular manner of implementation. Examples of specific implementations and applications are provided primarily for illustrative purposes.

Third-party content (e.g., advertisements) may be provided for display to devices based on a browsing history associated with the device. The present disclosure is directed towards techniques that utilize information to determine future events and activities associated with a user of the device and then to provide third-party content for display that is directed towards the future events even if topics related to the future event are unable to be determined from the browsing history of the device. To do so, the present disclosure can evaluate event related information that may be stored on a calendar associated with the user of the device to suggest third-party content that may be relevant to the user of the device that is related to topics that may not be identifiable from the browsing history of the device.

The present disclosure provides methods, apparatus and systems for creating a data structure that includes a plurality of relevancy scores, each indicating a level of relevancy of a keyword cluster related to an event for various time periods corresponding to different lengths of time from the event. Each relevancy score corresponds to a keyword cluster—time period—event combination. In this way, when a request to serve third-party content is received, a data processing system can perform a lookup via the data structure to identify the keyword cluster with the highest relevancy score for selecting third-party content to provide for display. The keyword cluster may be identified based on the type of event and the time period relative to the event. Additional details related to for creating a data structure that includes a plurality of relevancy scores, each indicating a level of relevancy of a keyword cluster related to an event for various time periods corresponding to different lengths of time from the event are provided below with respect to Section A.

The present disclosure is also directed towards techniques for selecting third-party content for a device based on calendar events of a user associated with the device and a length of time between the time third-party content is to be served and the calendar event. Imagine a scenario in which a user, John, may enter a calendar entry in their calendar for an event "Atlantis Trip." For such an event, third-party content related to various topics, including travel, flights, Bahamas, swimwear, snorkel, jet ski, beach, among others may be relevant to John based on the event. Moreover, some of these topics may be more relevant to John a few weeks before the trip to Atlantis, for example, travel related content, while other topics, such as snorkeling or jet skiing may be more relevant to John only a few days before the trip to Atlantis as John, like other users, is likely to act on reserving snorkeling or jet skiing excursions only a few days prior to the trip to Atlantis.

The data processing system may automatically select third-party content for the device based on the calendar events of the user associated with the device and a length of time between the time third-party content is to be served and the calendar event. To do so, the data processing system may be configured to determine the context of an event, for example, by clustering the keywords from the subject and description of the event. The data processing system may further be configured to assign an importance score to the event. The importance score may be based on a number of people invited, the significance of one or more keywords, for example, graduation will score very highly as historically, the performance of third-party content related to graduation related topics perform better than others, the location of the event, among others. The data processing system may be configured to adjust a relevance score assigned to candidate third-party content related to certain topics by a predictive relevance factor based on the time duration from the event. As such, using the Atlantis trip scenario above, third-party content related to flights may have a higher relevance score in the weeks leading up to the event than in the last few days leading up to the event, while third-party content related to snorkeling excursions may have a lower relevance score in the weeks leading up to the event than in the last few days leading up to the event. In some implementations, the relevancy score may also adjust based on one or more conversions resulting from the third-party content, for example, if the user makes a flight reservations for the Atlantis trip, the relevancy score of third-party content related to limousine rides to the airport may increase, while the relevance score of flights may decrease (presumably in response to determining that the flight reservations have been made). Additional details related to automatically selecting third-party content for a device based on calendar events of a user associated with the device and a length of time between the time third-party content is to be served and the calendar event are provided below with respect to Section B.

The present disclosure also provides methods, apparatus and systems to adjust relevancy scores for a given keyword cluster—time period—event category combination based on the performance of third-party content selected for display. To do so, the data processing system can look at historical performance of third-party content. In particular, the data processing system can identify, for a keyword cluster—time period—event category combination, a plurality of content serving activities serving content items. The content item selected in each of the content serving activities is based on i) an event that corresponds to a particular event type, ii) a keyword cluster associated with the particular event type, and iii) a length of time between the content serving activity and the event. The data processing system can then determine, for the combination, a performance for each of the served content items corresponding to the combination. The data processing system can then aggregate, for the combination, the performance of the served content items and adjust a relevancy score of the combination based on the aggregate performance of the served content items. Additional details of the methods and systems for adjusting relevancy scores for a given keyword cluster—time period—event category combination based on the performance of third-party content are provided below in Section C.

FIG. 1 is a block diagram depicting one implementation of an environment for providing third-party content for display based on event related information. In particular, FIG. 1 illustrates a system 100 for automatically selecting third-party content for a device based on calendar events of a user associated with the device and a length of time between the time third-party content is to be served and the calendar event, creating a data structure that includes a plurality of relevancy scores, each indicating a level of relevancy of a keyword cluster related to an event type for a given time period relative to the event and adjusting relevancy scores for a given keyword cluster—time period—event category combination based on the performance of third-party content.

The system 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one end user computing device 125. The network 105 may be any form of computer network that relays information between the user computing device 115, data processing system 110, and one or more content sources, for example, web servers, advertising servers, amongst others.

For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one event parsing module 130, at least one relevancy score generation module 132, at least one content selection module 134 and at least one relevancy score adjustment module 136 and at least one database 140. Details of the event parsing module 130 and the relevancy score generation module 132 will be provided below in Section A of the present disclosure. Details of the content selection module 134 will be provided below in Section B of the present disclosure. Details of the relevancy score adjustment module 136 will be provided below in Section C of the present disclosure.

The event parsing module 130, the relevancy score generation module 132, the content selection module 134 and the relevancy score adjustment module 136 can each include at least one processing unit, server, virtual server, circuit, engine, agent, appliance, or other logic device such as programmable logic arrays configured to communicate with the database 140 and with other computing devices (e.g., the content provider computing device 115, the content publisher computing device 120, or the end user computing device 125) via the network 105.

The event parsing module 130, the relevancy score generation module 132, the content selection module 134 and the relevancy score adjustment module 136 can include or execute at least one computer program or at least one script. The event parsing module 130, the relevancy score generation module 132, the content selection module 134 and the relevancy score adjustment module 136 can be separate components, a single component, or part of the data processing system 110. The event parsing module 130 and the relevancy score generation module 132, can include combinations of software and hardware, such as one or more processors configured to execute one or more scripts to identify an event associated with a device identifier, determine, event parameters of the identified event, determine, from the event parameters, a plurality of keyword clusters associated with the event parameters for serving content to a computing device associated with the device identifier, generate a relevancy score for each of the plurality of keyword clusters over a plurality of time periods relative to the event, create, for the event, a data structure including the plurality of keyword clusters and the generated relevancy scores for each of the plurality of keyword clusters over the plurality of time periods relative to the event and store, to a memory, the created data structure, for instance.

The content selection module 134 can include combinations of software and hardware, such as one or more processors configured to execute one or more scripts to receive a request to serve content, identify a device identifier associated with the request, determine, from the device identifier, an event for which to serve content, determine, from the request, a length of time from the event, select, based on the length of time from the event and event parameters associated with the event, content for display and provide the selected content for display at a computing device associated with the device identifier, for instance.

The relevancy score adjustment module 136 can include combinations of software and hardware, such as one or more processors configured to execute one or more scripts to identify an event category associated with one or more relevancy scores, identify, from a content serving opportunity log, a plurality of content serving opportunities associated with the event category in which content served in the content serving opportunity is selected based on a keyword cluster associated with the event category, determine, for each of the identified content serving opportunities, an event for which content was served in the content serving opportunity, identify, for each of the identified content serving opportunities, a time period corresponding to a length of time between a time the content of the content serving opportunity was provided for display and a time at which the event was scheduled to occur, determine, for each of the identified content serving opportunities, a keyword cluster that effected a selection of the content provided for display, identify, from the plurality of content serving opportunities, a subset of content serving opportunities, each of the subset of subset of content serving opportunities corresponds to the identified event category, a particular keyword cluster and a particular time period, determine, for each of the subset of content serving opportunities, a performance of the content associated with the subset of content serving opportunities that is provided for display and adjusting a relevancy score of a keyword cluster—time period—event category combination based on the performance of the content of the subset of content serving opportunities, for instance.

The content provider computing devices 115 can include servers or other computing devices operated by a content provider entity to provide content items such as advertisements for display on information resources at the end user computing device 125. The content provided by the content provider computing device 115 can include third party content items or creatives (e.g., ads) for display on information resources such as a website or web page that includes primary content, e.g. content provided by the content publisher computing device 120. The content items can also be displayed on a search results web page. For instance, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine web site. The primary content of search engine web pages (e.g., a results or landing web page) can include results of a search as well as third party content items displayed in content slots such as content items from the content provider computing device 115.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, end user computing devices, consumer computing devices, servers, clients, and other computing devices. The end user computing device 125, the content provider computing device 115, and the content publisher computing device 120 can include user interfaces such as microphones, speakers, touchscreens, keyboards, pointing devices, a computer mouse, touchpad, or other input or output interfaces.

The content provider computing devices 115, the content publisher computing devices 120 and the end user computing devices 125 may be any number of different user electronic devices, for example, a laptop computer, a desktop computer, a tablet computer, a smartphone, a digital video recorder, a set-top box for a television, a video game console, or any other computing device configured to communicate via the network 105. The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120 and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

The data processing system can also include one or more content repositories or databases 140. The databases 140 can be local to the data processing system 110. In some implementations, the databases 140 can be remote to the data processing system 110 but can communicate with the data processing system 110 via the network 105. The databases 140 can store information associated with a large number of websites for which the data processing system is configured to create an attribution model. Additional details of the contents of the databases 140 will be provided below.

For situations in which the event parsing module 130, the relevancy score generation module 132, content selection module 134, the relevancy score adjustment module 136 or any other module collects personal information about a user, or may make use of personal information, the user may be provided with an opportunity to control which programs or features collect such information, the types of information that may be collected (e.g., a user's preferences, a user's current location, a user's language, a user's type of device, etc.), and/or how third-party content may be selected by the data processing system and presented to the user. Certain data, such as a device identifier, may be anonymized in one or more ways before it is stored or used, so that personally identifiable information is removed when generating parameters (e.g., demographic parameters) used by the data processing system to select third-party content. For example, a device identifier may be anonymized so that no personally identifiable information about its corresponding user can be determined from it. In another example, a user's geographic location may be generalized where location information is obtained (such as to a city, ZIP code, state or country level), so that a precise location of the user cannot be determined. Thus, the user may have control over how information is collected about him or her and used by the data processing system 110. In some implementations, the user can be a user that has set up a calendar event. The user may have control over the type of information related to the calendar event that can be used by the data processing system 110. For instance, the user can restrict the data processing system 110 from using information from the calendar event, including but not limited to one or more of the type of event, the number of invitees or attendees coming to the event, the names, addresses or other information related to the invitees or attendees, the venue, time and date of the event, among others. Moreover, invitees that are invited to the calendar event of the user may be able to control the amount of information that the data processing system 110 can access or use. In some implementations, the invitees may be able to control the use of information pertaining to the invitee. In some implementations, invitees may be able to control the use of information pertaining to the invitee globally for all calendar invites or events. In some implementations, the invitees may be able to individually control the use of information pertaining to the invitee for each calendar invitation or event. In some implementations, the invitee may receive a request by the data processing system 110 to access or use one or more different types of information pertaining to the invitee. In some implementations, the request can be received along with the calendar invitation. The invitee can deny the request to access or use one or more different types of information pertaining to the invitee. The data processing system 110 may not use or access any information pertaining to the invitee until the data processing system 110 receives authorization from the invitee to use such information. In some implementations, the user can be a user requesting content or an advertiser providing one or more ads for display. Moreover, certain data can be used by the data processing system as aggregate data. Any personally identifiable information is removed when using such aggregate data. In some implementations, users may be provided with an opportunity to control whether such data can be used by the data processing system.

A. Creating a Data Structure that Includes a Plurality of Relevancy Scores Indicating a Level of Relevancy of a Keyword Cluster Related to an Event for Various Time Periods Corresponding to Different Lengths of Time from the Event The present disclosure also provides methods, apparatus and systems for creating a data structure that includes a plurality of relevancy scores, each indicating a level of relevancy of a keyword cluster related to an event for various time periods corresponding to different lengths of time from the event. Each relevancy score corresponds to a keyword cluster—time period—event combination. In this way, when a request to serve third-party content for display on a device of an identifier associated with an event is received, the data processing system can identify, from a data structure corresponding to the event, a keyword cluster based on a relevancy score of the keyword cluster corresponding to a time period that corresponds to the length of time between the request and the scheduled time associated with the event. From the keyword cluster, third-party content can be selected for display.

The event parsing module 130 can be configured to identify one or more events for at least one identifier. In some implementations, the one or more events can be events scheduled to take place in the future. In some implementations, the events may include events for which a user hosting or participating in the event is likely to respond to third-party content items related to the event in an effort to select and serve relevant third-party content to the user. In some implementations, the events may be events that can trigger the selection of certain third-party content items that the user is likely to act upon. The identifier can correspond to a particular device or to a profile associated with a particular device. In some implementations, the identifier can correspond to a profile associated with a plurality of devices that are related to one another via the profile. In some implementations, the profile can be a login account, or can be associated with a particular user of one or more devices.

The event parsing module 130 can be configured to identify the events from one or more calendars. In some implementations, the event parsing module 130 can identify one or more calendars associated with the identifier. In some implementations, the calendars can be electronic calendars associated with a mail application of the identifier. In some implementations, the calendars can be electronic calendars associated with a device of the identifier. In some implementations, the event parsing module 130 can identify an event included in the calendar in or near real time as the event is added to the calendar. In some implementations, the event parsing module 130 can identify events included in the calendar in an offline process, that periodically checks the calendars associated with the identifier to identify upcoming events. In some implementations, the event parsing module 130 may identify events included in a calendar that are scheduled to occur within a predetermined threshold, for example, 1 year.

The event parsing module 130 can be configured to identify contents of the event. In some implementations, the event parsing module 130 can parse the contents of the event to determine one or more event parameters related to the event, which can then be used to select third-party content relevant to the identifier. The event parameters may include an event type, event size, event date and time, event location, event invitees, event attendees, among others. The event parameters may be used to understand the context of the event to serve third-party content that are relevant to the user associated with the event.

Figure 2:
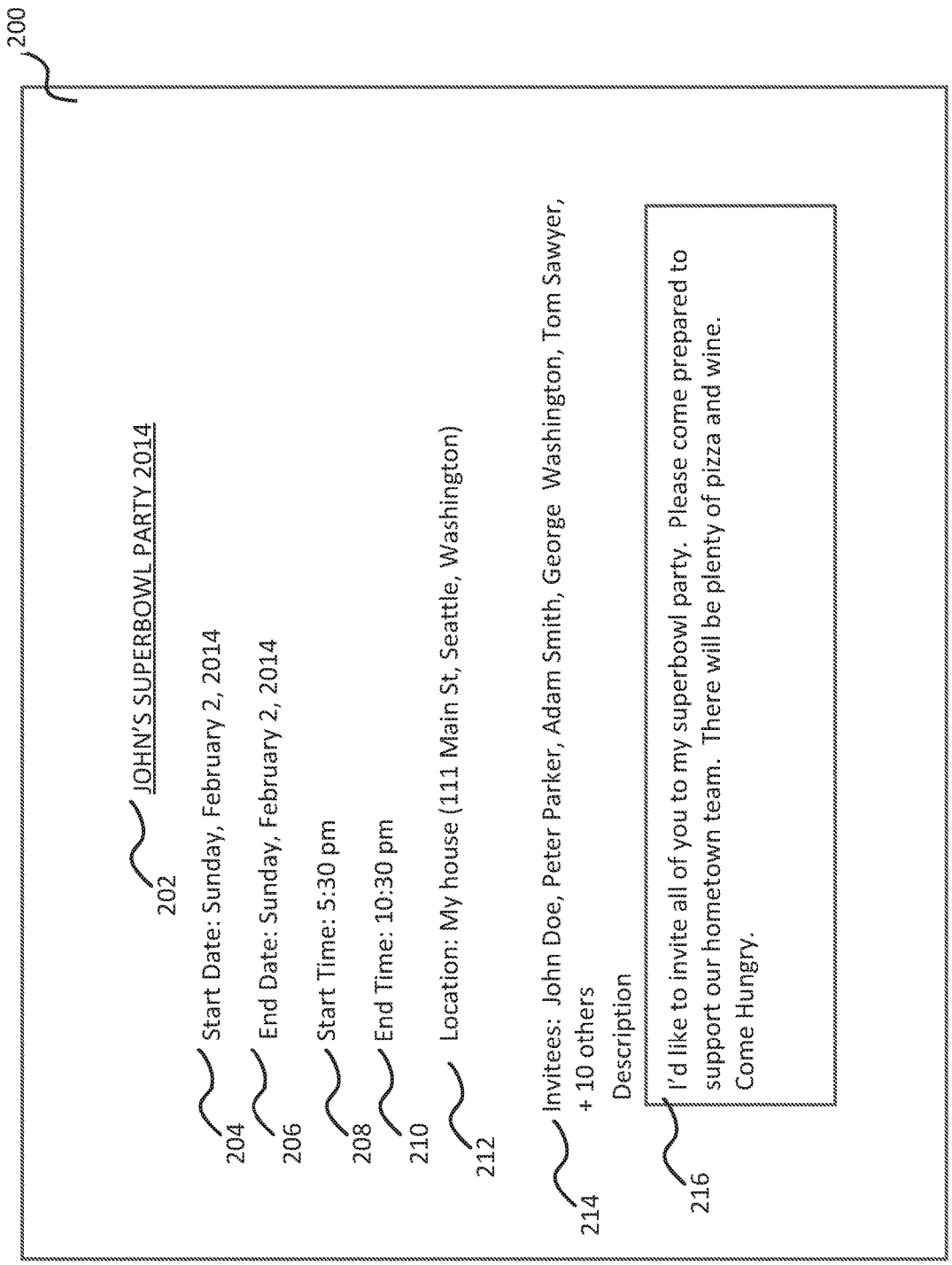
FIG. 2 shows a conceptual illustration of an example of a calendar entry of an event.

Referring now also to FIG. 2, FIG. 2 shows a conceptual illustration of a calendar entry of an event. In some implementations, the event can be created as a calendar entry by a user. In some implementations, the event can be automatically generated from a mail application or other application capable of identifying an event from contents. In some implementations, the event can be associated with a user profile or identifier associated with the user or device of the user. In some implementations, the event can be created as a calendar entry of a calendar associated with user profile or identifier associated with the user or device of the user.

The calendar entry 200 includes one or more event fields, including but not limited to an event title 202, a start date 204, an end date 206, a start time 208, an end time 210, a location 212, an invitee list 214 and an event description 216. The event parsing module 130 can be configured to parse the calendar entry 200 and the event fields included in the entry 200 to extract event related information, including event parameters.

In some implementations, the event parsing module 130 can parse the event title 202 and the event description 216 to determine a type of event. For instance, the event parsing module 130 can identify one or more keywords from the event title and event description that may indicate at type of event. The event parsing module 130 can maintain a list of keywords that may indicate a type of event. Examples of these keywords can include words such as "Championship," "Superbowl," "Birthday," "Welcome," "Graduation," among others. The keywords can include other words for which events may be hosted. Such words can include various words that heuristically have been associated with calendar entries associated with events. In some implementations, the event parsing module 130 can be configured to identify one or more keywords that have been included in multiple calendar entries and include the identified keywords in a list of keywords that may indicate a type of event. In some implementations, the event parsing module 130 can maintain the list of keywords indicating a type of event. In some implementations, the event parsing module 130 can store the list of keywords in a database, such as the database 140. In some implementations, the event parsing module 130 may add keywords indicating a type of event based on heuristics.

In some implementations, the event parsing module 130 can use the start date or end date of the event to determine one or more event parameters. For example, if the start and end date correspond to October 31, the event parsing module 130 may determine that the event type corresponds to "Halloween." In some implementations, the event parsing module 130 can use the start time or end time of the event to determine characteristics of the event. For example, if the start time corresponds to 6:30 pm and the end time corresponds to 10:30 pm, the event parsing module 130 may determine that the event corresponds to a dinner. In some implementations, the event parsing module 130 may determine that the event corresponds to a dinner by identifying one or more keywords in the event description that may be suggestive or indicative of dinner. In some implementations, the event parsing module 130 may determine that the event corresponds to a dinner based on the location of the event. For instance, if the event is at a restaurant, the event parsing module 130 may determine that the event may correspond to a dinner based on the location and the times of the event.

Moreover, the event parsing module 130 can determine one or more event parameters from the invitee list 214. In some implementations, the event parsing module 130 can identify a number of invitees to determine event parameters, such as the size of the event. In some implementations, the event parsing module 130 can identify one or more invitee names and based on the names, determine whether the event is a formal event or a casual event. For example, if the list of invitees includes names of celebrities, the event may be a more formal affair in comparison to an event in which the invitees include friends and family of the host. In some implementations, the event parsing module 130 may be able to identify associations between the invitees based on their names, their email addresses, among others. For example, if all of the invitees have the same domain name, for example, a domain name of a business, associated with their email address, the event parsing module 130 can identify that the event may be related to the business, for example, a business meeting. In some implementations, the event parsing module 130 may be able to determine, from social networks or other applications, the associations or relationship between the invitees and the host or among the invitees themselves. As described above, the event parsing module 130 may only be able to use or access information that the invitees and host of the event for which the event parsing module 130 has received authorization.

Accordingly, the event parsing module 130 can determine various event parameters from the various fields in the calendar entry associated with the calendar event. These event parameters can include event type, event location or venue, event size, formal or informal event, social event or business event, event date and time, event menu, event theme, and other related information that may be determined from the contents of one or more event fields, such as the event description.

Figure 3A:
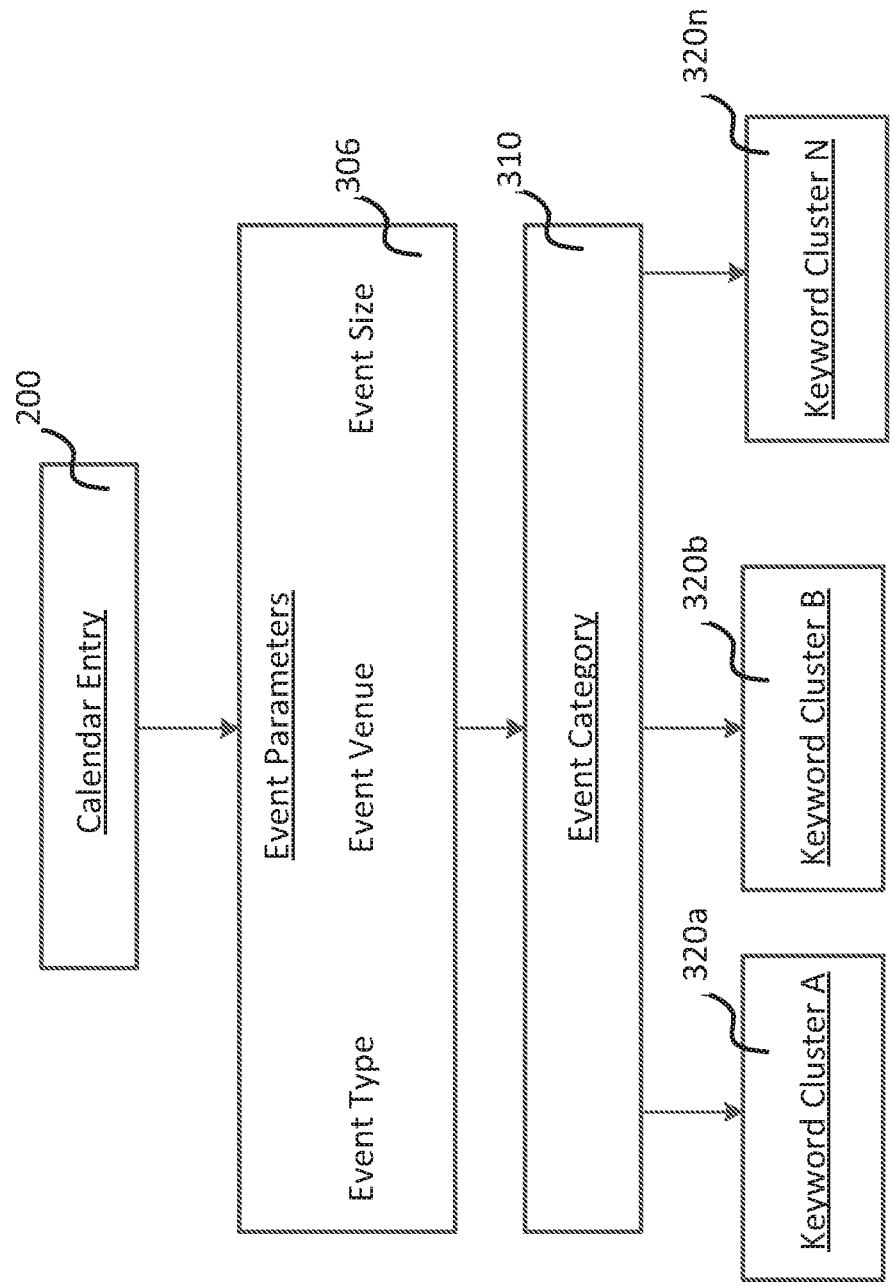
FIG. 3A shows a conceptual illustration of an example of a relationship between a calendar entry, one or more event parameters, one or more event categories and a plurality of keyword clusters.

Referring now also to FIG. 3A, FIG. 3A shows a conceptual illustration of a relationship between a calendar entry 200, one or more event parameters 302, one or more event categories 310 and a plurality of keyword clusters 320*a*-*n*. In some implementations, the event parsing module 130 can determine, based on the one or more event parameters 302 determined from the calendar entry, at least one event category 310 to which the event belongs. In some implementations, the event categories may be predetermined event categories defined by the data processing system 110. Event categories can correspond to one or more event parameters. For example, for a calendar entry for which the event type is Superbowl party, event location is home, and event size is 10, the event category can correspond to "Superbowl-home-small." In some implementations, the event category can be based on a plurality of parameters. The granularity of the event categories increases as the number of predetermined event categories increases. For instance, the list of predetermined event categories can correspond to a combination of values corresponding to event type, event venue and event size.

The range of possible values for event type may be limited to a predetermined list of event types. In some implementations, the list of event types may be determined heuristically by analyzing a plurality of calendars of identifiers to determine the most frequently scheduled types of events.

Similarly, the range of possible values for event location may be limited to a predetermined list of event venues. In some implementations, the list of event venues may be determined heuristically by analyzing a plurality of calendars of identifiers to determine the most frequently scheduled venues for events. In some implementations, the list of event venues can include the following: home, office, restaurant, club house, hotel, park, community center.

The range of possible values for event size may be limited to a predetermined list of event venues. In some implementations, the list of event venues may be determined heuristically by analyzing a plurality of calendars of identifiers to determine the most frequently scheduled event sizes. In some implementations, the list of event sizes can include the following: couple (2 people), small (3-10 people), medium (11-25 people), large (25-50 people), extra large (51-200 people) and extra extra large (201+ people).

The event parsing module 130 may determine a predetermined list of event categories by combining a value from each of an event type, event venue and event size. In some implementations, the event parsing module 130 may determine a predetermined list of event categories by combining a value from one or more event parameters, not limited to event type, event venue and event size. The predetermined list of event categories may be stored in a database, such as the database 140.

The event parsing module 130 may select an event category from the list of event categories based on the one or more event parameters determined from the calendar entry. The event parsing module 130 can select the event category most closely related to the event parameters of the calendar entry. In some implementations, the event parsing module 130 may provide a higher weight to event type relative to event venue and event size such that if none of the list of event categories matches the event parameters, an event category may be selected based on event type alone. In some implementations, the event parsing module 130 may select a plurality of event categories from the list of event categories based on the one or more event parameters determined from the calendar entry.

In some implementations, the event parsing module 130 can determine, from the event parameters, a plurality of keyword clusters associated with the event parameters. In some implementations, the plurality of keyword clusters can include one or more keyword clusters on which one or more third-party content providers bid to serve content to a computing device of the identifier associated with the event. In some implementations, these keyword clusters can be associated with topics that match one or more of the event parameters or event category. In some implementations, the event parsing module 130 can perform a lookup in a database for keyword clusters based on the event parameters.

In some implementations, the event parsing module 130 can determine a plurality of keyword clusters from the one or more selected event categories. In some implementations, the event parsing module 130 can determine, from the selected event category, one or more topics to which the event category is related. The event parsing module 130 can then identify, from a predetermined list of keyword clusters, one or more keyword clusters that are related to the determined topics to which the event category is related. The event parsing module 130 can then associate the identified keyword clusters to the event category.

In some implementations, the plurality of keyword clusters may be associated with the predetermined list of event categories. In some implementations, the event parsing module 130 can associate keyword clusters with an event category. The event parsing module 130 can identify which keyword clusters to associate with one or more event categories based on the contents of the event categories. In some implementations, the keyword clusters can be related to one or more topics. As such, if the event category relates to a particular topic, keyword clusters associated with that topic can be associated with the event category. For example, if the event category is 'superbowl party—home—small,' example keyword clusters that can be associated with the event category can include pizza, beer, sports teams participating in the Superbowl, TV, among others. In another example, if the event category is "Atlantis—couple," example keyword clusters can include "vacation, romantic, Bahamas, travel, airline tickets, beach, swimwear, among others. In yet another example, if the event category is "graduation—large," example keyword clusters can include "event planner, graduation venues, graduation photographer, graduation cake, graduation decoration, among others. In some implementations, the event parsing module 130 can associate keyword clusters to the predetermined list of event categories in real time or in an offline process. In some implementations, the event parsing module 130 may store the keyword clusters and their association with the event categories in the database 140.

In some implementations, the relevancy score generation module 132 can be configured to generate a relevancy score for each of the plurality of keyword clusters that is specific to a particular time period corresponding to a length of time from a scheduled event. The granularity of the length of time can vary, with smaller granularity resulting in the utilization of more computing resources. The granularity of length may range from minutes, to hours, to days, to weeks, and to months. In some implementations, a first time period can extend from 3 weeks to 1 week before the scheduled event, a second time period can extend from 1 week till the scheduled event, and a third time period can extend from the scheduled event to 1 week after the scheduled event. In some implementations, the time periods may overlap with one another. In some implementations, there may be gaps between two consecutive time periods. In some implementations, the relevancy score generation module 132 can identify a plurality of time periods for which to generate relevancy scores. In some implementations, the relevancy score generation module 132 can identify a plurality of time periods for which to generate relevancy scores heuristically based on past performance of third-party content items served. In some implementations, the relevancy score generation module 132 can define a plurality of time periods for which to generate relevancy scores.

In some implementations, the relevancy score generation module 132 can generate, for any given time period relative to the event, a relevancy score for one of the identified keyword clusters corresponding to the event category to which the event corresponds. In some implementations, the relevancy score generation module 132 can generate the relevancy score of a keyword cluster for the given time period relative to the event based on historical performance of third-party content corresponding to the keyword cluster. In particular, the relevancy score generation module 132 can generate the relevancy score of a keyword cluster for the given time period relative to the event based on historical performance of third-party content corresponding to the keyword cluster that is served for display at a time that is within the given time period relative to an event that corresponds to the same event category or is similar to the event for which the relevancy score generation module 132 is generating the relevancy score.

Figures 3B, 3C:
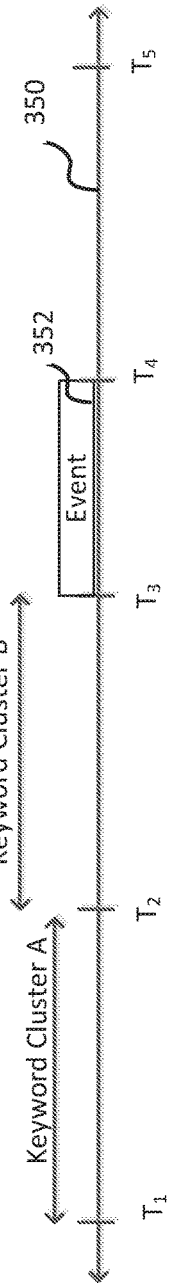
FIG. 3B shows a conceptual illustration of an example of a content serving opportunity log of two event categories.
FIG. 3C shows an example of a timeline specific to a particular event category that includes an event and keyword clusters having the highest relevancy scores for a plurality of representative lengths of time relative to the event.

Referring briefly to FIG. 3B, a conceptual illustration of a content serving opportunity log associated with two event categories is shown. The content serving opportunity log 360 includes a plurality of entries 380a-380n. Each entry corresponds to a unique content serving opportunity CS1-CS8. Each entry includes a plurality of fields, including a content serving opportunity identifier field 362, an event identifier field 364, an event category field 366, a keyword cluster field 368, a content identifier field 370, a length of time field 372, a conversion field 374 and a profile identifier field 376. The event identifier field 364 identifies an event based on which content was selected to be served for the corresponding content serving opportunity. The event category field 366 identifies the event category with which the event is associated. This can be determined by the event parsing module 130 as described above. The keyword cluster field 368 identifies the keyword cluster corresponding to the event category that is associated with the content served. The content identifier field 370 identifies the third-party content item served in the content serving opportunity. The length of time field 372 indicates the length of time between the time the content was served and the event associated with the event ID 364 is scheduled to begin. The conversion field 374 identifies whether the content received a conversion during the content serving opportunity and the profile identifier field 376 identifies a device or user identifier corresponding to the event.

The relevancy score generation module 132 can determine a relevancy score for each keyword cluster (Swimwear, Travel, HDTV and sports apparel) from the content serving opportunity log 360. For the sake of explanation, a first time period may extend from 2 weeks to 1 week before the event and a second time period may extend from 1 week till the event. To determine the relevancy score of the keyword cluster Swimwear for the first time period for an event corresponding to the event category Atlantis, the relevancy score generation module 132 can identify all content serving opportunities in which the keyword cluster field 368 includes the keyword cluster Swimwear, the event category field 366 includes Atlantis, and the length of time field 372 includes any value between 8 and 14 days. The relevancy score generation module 132 can determine, from the identified content serving opportunities, a relevancy score for the keyword cluster Swimwear for the event category Atlantis for the first time period based on the ratio of content serving opportunities in which a conversion occurred relative to the total number of identified content serving opportunities. In FIG. 3B, the relevancy score for the keyword cluster Swimwear for the event category Atlantis for the first time period is 0. Conversely, the relevancy score for the keyword cluster Swimwear for the event category Atlantis for the second time period is 1. The relevancy score for the keyword cluster Travel for the event category Atlantis for the first time period is 1 and for the second time period is 0. The relevancy score for the keyword cluster HDTV for the event category Superbowl for the first time period is 1 and for the second time period is 0. The relevancy score for the keyword cluster Sports apparel for the event category Superbowl for the first time period is 0 and for the second time period is 1.

To determine a relevancy score for a keyword cluster-event category pair for a plurality of time periods, the relevancy score generation module 132 can identify content serving opportunities in which third-party content related to the keyword cluster for the event category was served. From the identified content serving opportunities, the relevancy score generation module 132 can determine a subset of those content serving opportunities as opportunities in which the third-party content was served within one of the plurality of time periods relative to a scheduled time of an event for which content was served. The relevancy score generation module 132 can determine a performance of the subset of content serving opportunities to determine a relevancy score. In some implementations, the relevancy score generation module 132 can determine the relevancy score of the keyword cluster for the time period relative to a scheduled time of an event for which content was served based on a conversion rate of the subset of content serving opportunities. In some implementations, conversion rates can be determined based on click throughs, sales, or other performance metrics. In this way, the relevancy score generation module 132 can determine the relevancy score of any keyword cluster for any given length of time relative to an event.

Referring briefly to FIG. 3C, FIG. 3C shows a timeline 390 specific to a particular event 392. As shown in 3C, the timeline includes time variables $T_1$, $T_2$, $T_3$, $T_4$, and $T_5$. In the timeline 390, the event 392 begins at $T_3$ and ends at $T_4$. A first length of time relative to the scheduled event 392 extends from $T_1$ to $T_2$, a second length of time relative to the scheduled event 392 extends from $T_2$ to $T_3$, and a third length of time relative to the event 392 extends from $T_4$ to $T_5$. The values of time variables $T_1$, $T_2$, $T_3$, $T_4$, and $T_5$ may be defined by the event parsing module 130. In some implementations, the values of time variables $T_1$, $T_2$, $T_3$, $T_4$, and $T_5$ may be defined specific to each keyword cluster. In some implementations, the values of time variables $T_1$, $T_2$, $T_3$, $T_4$, and $T_5$ may be universally defined across multiple keyword clusters. In some implementations, the values of time variables $T_1$, $T_2$, $T_3$, $T_4$, and $T_5$ may be defined heuristically by determining lengths of times relative to the event in which third-party content related to the keyword cluster achieve improved performance.

The timeline 390 provides a visual representation of the keyword clusters that have the highest relevancy score for a given length of time relative to the event 392 corresponding to a particular event category, such as the event category 310 shown in FIG. 3A. The timeline 390 represents that keyword cluster A 320a has the highest relevancy score during the length of time extending from $T_1$ to $T_2$, keyword cluster B 320b has the highest relevancy score during the length of time extending from $T_2$ to $T_3$, and keyword cluster N 320n has the highest relevancy score during the length of time extending from $T_4$ to $T_5$. Based on the content serving opportunity log 360, for the event category Atlantis, the keyword cluster A can be represented as Travel and the keyword cluster B can be represented as Swimwear, where $T_1$ is 14 days and $T_2$ is 7 days prior to the scheduled event time of $T_3$. For the event category Superbowl, the keyword cluster A can be represented as HDTV and the keyword cluster B can be represented as sports apparel, where $T_1$ is 14 days and $T_2$ is 7 days prior to the scheduled event time of $T_3$.

The relevancy score for various time periods corresponding to lengths of times relative to a scheduled start time of an event for each keyword cluster corresponding to a given event category can be determined in other ways. In some implementations, the relevancy score can be determined based on analyzing search queries and the timing of search queries relative to an event date. For example, in 2014, the Superbowl was held on February 2. The relevancy score generation module 132 can, in conjunction with one or more other modules, determine the volume of search queries related to a particular keyword cluster associated with the Superbowl across multiple time periods. If the volume of search queries related to the keyword cluster 'televisions' between 2 weeks and 1 week prior to the Superbowl is greater than search queries related to other keyword clusters associated with the Superbowl, the relevancy score of the keyword cluster 'televisions' may be determined to have a higher relevancy score than the other keyword clusters. In some implementations, the search queries considered in determining relevancy scores may be limited to search queries from devices that may be associated with attending or hosting a Superbowl related event. In some implementations, the relevancy score can be based on a percentage of activity associated with a keyword cluster across multiple time periods. Examples of activity can include search queries, third-party content performance, website visits, and other online activity that may be tied to a keyword cluster.

In some implementations, the relevancy score generation module 132 can generate a relevancy score for each of the plurality of keyword clusters over a plurality of time periods relative to the event by determining, from historical data, performance of content associated with the keyword cluster across each of a plurality of time periods relative to events similar to the event associated with the identified calendar entry 200. In some implementations, the relevancy score generation module 132 may determine events to be similar if the events correspond to the same event category 310. In some implementations, the relevancy score generation module 132 may determine, from historical data, performance of content associated with the keyword cluster across each of a plurality of time periods relative to events similar to the event associated with the device identifier by first identifying, from historical data, a content item selected for display that is associated with a particular keyword cluster of the plurality of keyword clusters. The relevancy score generation module 132 can then determine, for at least one device identifier to which the content item was served, an event corresponding to which the keyword cluster was determined. The relevancy score generation module 132 can then determine a time associated with the event and determine a time period from the event at which the content item was served. The relevancy score generation module 132 can then determine if any action was taken responsive to providing the content for display. By doing this for each content item that is selected for display that is associated with a particular keyword cluster of the plurality of keyword clusters, the relevancy score generation module 132 can determine, from the performance of the content items, the relevancy scores of keyword clusters across multiple time periods corresponding to lengths of times relative to an event.

The relevancy score generation module 132 can be configured to determine, for a first time period and an event category pair, a first subset of the keyword clusters associated with the event category that have higher relevancy scores than a second subset of the keyword clusters. The relevancy score generation module 132 can also determine, for a pair corresponding to the same event category but a second time period, that the second subset of the keyword clusters associated with the event category have higher relevancy scores than the first subset of the keyword clusters. By being able to determine which keyword clusters have the highest relevancy scores for a given time period relative to an event, the relevancy score generation module 132 can, with one or more other modules of the data processing system 110, select third-party content associated with the keyword clusters having the highest relevancy scores to serve at the given time period.

The event parsing module 130 or the relevancy score generation module 132 can be configured to create, for each of the predetermined list of event categories, a data structure including the plurality of keyword clusters and the generated relevancy scores for each of the plurality of keyword clusters over the plurality of time periods relative to an event corresponding to the event category. In some implementations, the event parsing module 130 or the relevancy score generation module 132 can be configured to create, for the event associated with the calendar entry from which the event category, a data structure including the plurality of keyword clusters and the generated relevancy scores for each of the plurality of keyword clusters over the plurality of time periods relative to the event. In some implementations, the event parsing module 130 or the relevancy score generation module 132 can store the created data structure in the database 140. In some implementations the event parsing module 130 or the relevancy score generation module 132 can store the created data structure in a data file associated with the calendar entry. In some implementations, the event parsing module 130 or the relevancy score generation module 132 can store the created data structure such that one or more other modules of the data processing system 110 can access the data structure to identify one or more third-party content items to serve to a device associated with the calendar entry, for example, a device corresponding to an identifier that created the calendar entry in a calendar of the identifier.

Figure 4:
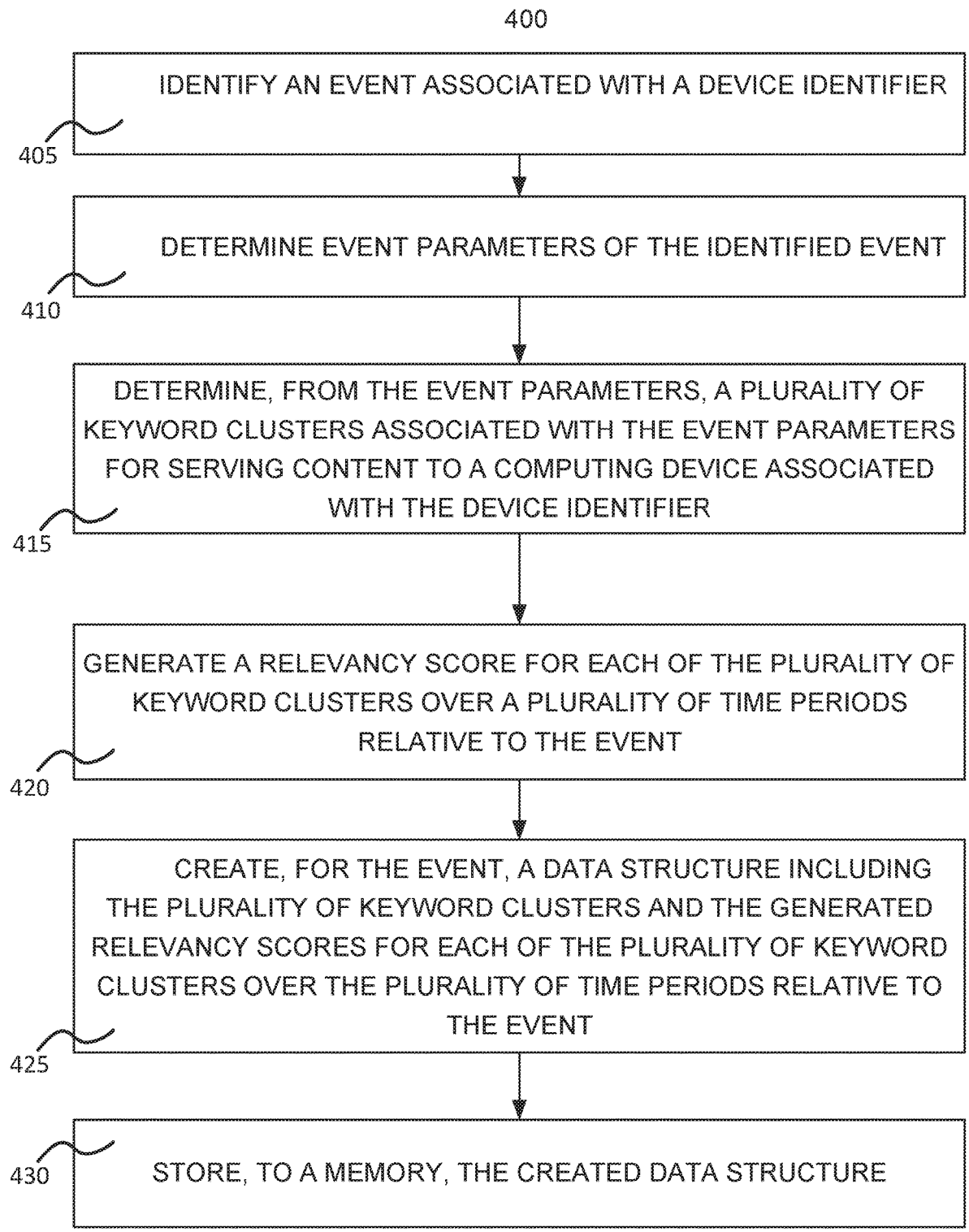
FIG. 4 is a flow diagram depicting one implementation of creating a data structure that includes a plurality of relevancy scores, each indicating a level of relevancy of a keyword cluster related to an event for various time periods corresponding to different lengths of time from the event.

FIG. 4 is a flow diagram depicting one implementation of the steps taken to create a data structure that includes a plurality of relevancy scores corresponding to keyword cluster—time period—event category combinations. One or more processors can identify an event associated with a device identifier (BLOCK 405). The processors can determine event parameters of the identified event (BLOCK 410). The processors can determine, from the event parameters, a plurality of keyword clusters associated with the event parameters for serving content to a computing device associated with the device identifier (BLOCK 415). The processors can generate a relevancy score for each of the plurality of keyword clusters over a plurality of time periods relative to the event (BLOCK 420). The processors can generate, for the event, a data structure including the plurality of keyword clusters and the generated relevancy scores for each of the plurality of keyword clusters over the plurality of time periods relative to the event (BLOCK 425). The processors can then store the created data structure to a memory (BLOCK 430). In some implementations, the processors can receive a request to serve content on the computing device associated with the device identifier. The processors can then determine a time period between a time at which the request was received and a time at which the calendar event is scheduled. The processors can then identify, from the stored data structure, a keyword cluster based on the relevancy score of the keyword cluster for the determined time period and an event category to which the identified calendar event belongs. In some implementations, the processors can select a content item based on the identified keyword cluster and provide, in response to the request, the selected content item for display at the computing device associated with the device identifier.

In further detail, the one or more processors can identify an event associated with a device identifier (BLOCK 405). In some implementations, the processors can identify, for at least one identifier, one or more events scheduled to take place in the future. The identifier can correspond to a particular device or to a profile associated with a particular device. In some implementations, the identifier can correspond to a profile associated with a plurality of devices that are related to one another via the profile. In some implementations, the profile can be a login account, or can be associated with a particular user of one or more devices. In some implementations, the event can be created as a calendar entry by a user. In some implementations, the event can be automatically generated from a mail application or other application capable of identifying an event from contents. In some implementations, the event can be associated with a user profile or identifier associated with the user or device of the user. In some implementations, the event can be created as a calendar entry of a calendar associated with user profile or identifier associated with the user or device of the user.

The processors can identify, for a given identifier, one or more events scheduled to take place in the future. In some implementations, the processors can identify one or more calendars associated with the identifier. In some implementations, the calendars can be electronic calendars associated with a mail application of the identifier. In some implementations, the calendars can be electronic calendars associated with a device of the identifier. In some implementations, the processors can identify events included in the calendar as the event is added to the calendar, or in an offline process, that periodically checks the calendars associated with the identifier to identify upcoming events. In some implementations, the processors may identify events included in a calendar that are scheduled to occur within a predetermined threshold, for example, 1 year.

The processors can determine event parameters of the identified event (BLOCK 410). To determine event parameters, the processors can identify contents of the event. In some implementations, the processors can parse the contents of the event to determine one or more event parameters related to the event, which can then be used to select third-party content relevant to the identifier. The event parameters may include an event type or category, event size, event date and time, event location, event invitees, event attendees, among others. The event parameters may be used to understand the context of the event to serve third-party content that are relevant to the user associated with the event.

The calendar entry associated with the event can includes one or more event fields, including but not limited to an event title, a start date, an end date, a start time, an end time, a location, an invitee list and an event description. The processors can be configured to parse the calendar entry and the event fields included in the entry to extract event related information, including event parameters.

In some implementations, the processors can parse the event title and the event description to determine a type of event. For instance, the processors can identify one or more keywords from the event title and event description that may indicate at type of event. The processors can maintain a list of keywords that may indicate a type of event. Such words can include various words that heuristically have been associated with calendar entries associated with events. In some implementations, the processors can be configured to identify one or more keywords that have been included in multiple calendar entries and include the identified keywords in the list of keywords that may indicate a type of event. The processors may do so using heuristics.

In some implementations, the processors can use the start date or end date of the event to determine one or more event parameters. In some implementations, the processors can use the start time or end time of the event to determine characteristics of the event. For example, if the start time corresponds to 6:30 pm and the end time corresponds to 10:30 pm, the processors may determine that the event corresponds to a dinner. In some implementations, the processors may determine that the event corresponds to a dinner by identifying one or more keywords in the event description that may be suggestive or indicative of dinner. In some implementations, the processors may determine that the event corresponds to a dinner based on the location of the event. Moreover, the processors can determine one or more event parameters from the invitee list. In some implementations, the processors can identify a number of invitees to determine event parameters, such as the size of the event. In some implementations, the processors can identify one or more invitee names and based on the names, determine whether the event is a formal event or a casual event. In some implementations, the processors may be able to identify associations between the invitees based on their names, their email addresses, among others. In some implementations, the processors may be able to determine, from social networks or other applications, the associations or relationship between the invitees and the host or among the invitees themselves. As described above, an invitee may be able to control the type and amount of information of the invitee the processors can use or access.

Accordingly, the processors can determine various event parameters from the various fields in the calendar entry associated with the event. These event parameters can include event type, event location or venue, event size, formal or informal event, social event or business event, event date and time, event menu, event theme, and other related information that may be determined from the contents of one or more event fields, such as the event description.

The processors can determine, from the event parameters, a plurality of keyword clusters associated with the event parameters for serving content to a computing device associated with the device identifier (BLOCK 415). In some implementations, the processors can determine keyword clusters that correspond to topics that also correspond to one or more of the event parameters of the event. In some implementations, to determine the plurality of keyword clusters, the processors can determine, based on the one or more event parameters determined from the calendar entry, at least one event category to which the event belongs. In some implementations, the event categories may be predetermined event categories defined by the processors. Event categories can correspond to one or more event parameters.

The processors may determine a predetermined list of event categories by combining a value from one or more event parameters, for example, an event type, event venue and event size. In some implementations, the processors may determine a predetermined list of event categories by combining a value from one or more of the determined event parameters. The predetermined list of event categories may be stored in a database.

The processors may select an event category from the list of event categories based on the one or more event parameters determined from the calendar entry. The processors can select the event category most closely related to the event parameters of the calendar entry. In some implementations, the processors may provide a higher weight to event type relative to event venue and event size such that if none of the list of event categories matches the event parameters, an event category may be selected based on event type alone. In some implementations, the processors may select a plurality of event categories from the list of event categories based on the one or more event parameters determined from the calendar entry.

In some implementations, the processors can determine a plurality of keyword clusters from the one or more selected event categories. In some implementations, the processors can associate a plurality of keyword clusters to each of the predetermined list of event categories. In some implementations, the processors can associate keyword clusters with an event category. The processors can identify which keyword clusters to associate with one or more event categories based on the contents of the event categories. In some implementations, the keyword clusters can be associated with one or more topics. As such, if the event category relates to a particular topic, keyword clusters associated with that topic can be associated with the event category. In some implementations, the processors can associate keyword clusters to the predetermined list of event categories in real time or in an offline process. In some implementations, the processors may store the keyword clusters and their association with the event categories in a database.

In some implementations, the processors can determine, from the event category, a plurality of keyword clusters associated with the event category. In some implementations, the plurality of keyword clusters can include one or more keyword clusters on which one or more third-party content providers bid to serve content to a computing device associated with the device identifier associated with the event. In some implementations, these keyword clusters can be associated with topics that match one or more of the event categories. In some implementations, the processors can perform a lookup in a database for keyword clusters based on the event categories.

The processors can generate a relevancy score for each of the plurality of keyword clusters over a plurality of time periods relative to the event (BLOCK 420). In some implementations, the processors can be configured to generate a relevancy score for each of the plurality of keyword clusters over a plurality of time periods relative to a scheduled event date or time. In some implementations, the processors can generate the relevancy score of a keyword cluster for a given length of time relative to an event based on historical performance of third-party content corresponding to the keyword cluster that is served for display within the given length of time relative to the event. For example, the processors can identify content serving opportunities in which third-party content related to a keyword cluster was served. From the identified content serving opportunities, the processors can determine a subset of those content serving opportunities as opportunities in which the third-party content was served within the given length of time relative to an event associated with an identifier of the device on which the third-party content was served. The processors can determine a performance of the subset of content serving opportunities to determine a relevancy score. The processors can determine the relevancy score of the keyword cluster for the given length of time relative to an event based on a conversion rate of the subset of content serving opportunities. In some implementations, conversion rates can be determined based on click throughs, sales, or other performance metrics. In this way, the processors can determine the relevancy score of any keyword cluster for any given length of time relative to an event.

In some implementations, the processors can be configured to identify a plurality of predetermined time periods corresponding to different lengths of times relative to an event. For example, the processors can determine a first length of time relative to an event of a particular event category to extend from 4 weeks prior to the event to 2 weeks prior to the event. The values of time variables corresponding to lengths of time relative to the event may be defined by the processors. In some implementations, the values of the time variables may be defined specific to each keyword cluster. In some implementations, the values of time variables may be universally defined across multiple keyword clusters. In some implementations, the values of the time variables may be defined heuristically by determining time periods relative to the event in which third-party content related to the keyword cluster achieve improved performance relative to other time periods relative to the event.

The relevancy score for various time periods corresponding to lengths of times relative to an event for each keyword cluster corresponding to a given event category can be determined in other ways. In some implementations, the relevancy score can be determined based on analyzing search queries and the timing of search queries relative to an event date. In some implementations, the search queries considered in determining relevancy scores may be limited to search queries from devices that may be associated with one or more events. In some implementations, the relevancy score can be based on a percentage of activity associated with a keyword cluster across multiple time periods. Examples of activity can include search queries, third-party content performance, website visits, and other online activity that may be tied to a keyword cluster.

In some implementations, the processors can generate a relevancy score for each of the plurality of keyword clusters over a plurality of time periods relative to the event by determining, from historical data, performance of content associated with the keyword cluster across each of a plurality of time periods relative to events similar to the event associated with the identified calendar entry. In some implementations, the processors may determine events to be similar if the events correspond to the same event category. In some implementations, the processors may determine, from historical data, performance of content associated with the keyword cluster across each of a plurality of time periods relative to events similar to the event associated with the device identifier by first identifying, from historical data, a content item selected for display that is associated with a particular keyword cluster of the plurality of keyword clusters. The processors can then determine, for at least one device identifier to which the content item was served, an event corresponding to which the keyword cluster was determined. The processors can then determine a time associated with the event and determine a time period from the event at which the content item was served. The processors can then determine if any action was taken responsive to providing the content for display. By doing this for each content item selected for display that is associated with a particular keyword cluster of the plurality of keyword clusters, the processors can determine, from the performance of the content items, the relevancy scores of keyword clusters across multiple time periods corresponding to lengths of times relative to an event.

The processors can be configured to determine, for a first time period and an event category pair, a first subset of the keyword clusters associated with the event category that have higher relevancy scores than a second subset of the keyword clusters. The processors can also determine, for a pair corresponding to the same event category but a second time period, that the second subset of the keyword clusters associated with the event category have higher relevancy scores than the first subset of the keyword clusters. By being able to determine which keyword clusters have the highest relevancy scores for a given time period relative to an event, the processors can, with a content serving system, select third-party content associated with the keyword clusters having the highest relevancy scores to serve at the given time period.

The processors can generate, for the identified event, a data structure including the plurality of keyword clusters and the generated relevancy scores for each of the plurality of keyword clusters over the plurality of time periods relative to the event (BLOCK 425). In some implementations, the processors can create, for each of the predetermined list of event categories, a data structure including the plurality of keyword clusters and the generated relevancy scores for each of the plurality of keyword clusters over the plurality of time periods relative to an event corresponding to the event category.

The processors can then store the created data structure to a memory (BLOCK 430). In some implementations, the processors can store the created data structure in a database. In some implementations the processors can store the created data structure in a data file associated with the calendar entry. In some implementations, the processors can store the created data structure such that one or more other modules a content serving system can access the data structure to identify one or more third-party content items to serve to a device associated with the calendar entry, for example, a device corresponding to an identifier that created the calendar entry in a calendar of the identifier.

B. Selecting Third-Party Content for a Device Based on a Calendar Event of an Identifier Associated with the Device and a Length of Time Between the Time the Third-Party Content is to be Served and the Time at which the Event is Scheduled to Occur As described above, the present disclosure relates to methods and systems for selecting third-party content for a device based on calendar events of a user associated with the device and a length of time between the time third-party content is to be served and the time at which the event is scheduled to occur. The event parsing module 130 and the content selection module 134 can include combinations of software and hardware, such as one or more processors configured to execute one or more scripts to perform one or more functions to facilitate selecting third-party content for a device based on calendar events of a user associated with the device and a length of time between the time third-party content is to be served and the time at which the event is scheduled to occur.

The content selection module 134 can include combinations of software and hardware, such as one or more processors configured to execute one or more scripts to can receive a request to serve content, identify a device identifier associated with the request, determine, from the device identifier, an event for which to serve content, determine, from the request, a length of time between a time the request to serve content is received and a time at which the event is scheduled to occur, select, based on the determined length of time and event parameters associated with the event, content for display and provide the selected content for display at a computing device associated with the device identifier, for instance.

The content selection module 134 can be configured to receive a request to serve content on a computing device. In some implementations, the content selection module 134 can receive a request to serve content in response to a device requesting access to an information resource. The content selection module 134 can receive a request to serve third-party content in one or more content slots of an information resource when the information resource is rendered for display on the computing device.

The content selection module 134 can identify an identifier associated with the request. In some implementations, the content selection module 134 can identify an identifier associated with the device on which to serve content. In some implementations, the identifier can be associated with a user of the device. In some implementations, the identifier can be associated with one or more applications, including a mail application, a calendar application, a social networking application, among others.

The content selection module 134 can be configured to determine, based on the identifier, an event for which to serve content. In some implementations, the content selection module 134 can determine, based on the identifier, a calendar including one or more events associated with the identifier. In some implementations, the content selection module 134 can determine an event for which the identifier is indicated as a host. In some implementations, the content selection module 134 can determine an event that a user associated with the identifier is attending or participating. The event can be any event for which third-party content providers may have an interest in providing content. In some implementations, the events can be events that are included in a calendar application associated with the identifier associated with the device on which to serve the requested content.

The content selection module 134 can select, from a plurality of identified events associated with the identifier, an event based on which to serve content. In some implementations, the content selection module 134 can select an event from the plurality of identified events based on an importance score for each of the identified events. The importance score can indicate a measure of how likely a user associated with the identifier is to be influenced by third-party content related to the event. The importance score can be determined based on one or more event parameters associated with the event. In some implementations, the content selection module 134 or some other module, such as the event parsing module 130, may already have analyzed each of the calendar entries and determined and assigned an importance score to each of the events. The process of determining an importance score may be performed in an offline process for each identifier associated with a calendar including one or more events. The importance score can be influenced by various factors including the type of event, the invitees of the event, the role of the user in the event, the number of attendees or invitees, the venue of the event, among others. Certain events, for example, a graduation may have a much higher importance score than a Superbowl watch party. The data processing system 110 may use heuristics to assign importance scores to various events. In some implementations, the data processing system 110 may look at the performance of third-party content items related to topics associated with the events to determine an importance score. In some implementations, the data processing system 110 may look at search query volume or other network activity to determine importance scores for various events. In some implementations, the data processing system 110 may attribute a certain portion of the importance score to certain events based on various other criteria.

The content selection module 134 can determine, from the request for content, a length of time between a time the request to serve content is received and a time at which the event is scheduled to occur. In some implementations, the content selection module 134 may identify a time at which an event is scheduled to occur. In some implementations, the content selection module 134 may identify a time at which an event is scheduled to occur via the event parsing module 134 as described above with respect to section A. The content selection module 134 may then determine a time at which the request to serve content is received. The content selection module 134 may determine a length of time from the time at which the request to serve content is received and the time at which the event is scheduled to occur.

In some implementations, the content selection module 134 can determine, from the length of time from the time at which the request to serve content is received and the time at which the event is scheduled to occur, a predetermined time period from the event to which the length of time corresponds. For example, if the length of time is 5 days, the content selection module 134 can determine that the length of time corresponds to a predetermined time period that extends from 1 week prior to the event to the time at which the event is scheduled to occur. As described above with respect to section A, the event parsing module 130 or the relevancy score generation module 132 may define the ranges for the predetermined time periods as well as the granularity of the time periods.

The content selection module 134 can also determine, via the event parsing module 130, one or more event parameters associated with the event. In some implementations, the content selection module 134 can determine, via the event parsing module 130, an event category to which the event corresponds based on the determined event parameters. Details regarding determining event parameters and event categories is provided above with respect to Section A.

In some implementations, the content selection module 134 can determine, from the event parameters or categories associated with the event and the length of time between the request to serve content and the time at which the event is scheduled to occur, one or more keyword clusters associated with the event categories associated with the event. The content selection module 134 may be configured to determine the keywords by performing a lookup in a data structure, for example, one of the data structures created by the event parsing module 130 and the relevancy score generation module 132. In some implementations, the content selection module 134 can identify, using the event category to which the event most closely relates, one or more keyword clusters associated with the event category.

In some implementations, the content selection module 134 can determine, for each of the identified keyword clusters associated with the event category, relevancy scores associated with each of the keyword clusters for the given time period corresponding to the length of time between the request to serve content and the time at which the event is scheduled to occur. The data structure associated with the event category can include relevancy scores for each keyword cluster for each of a plurality of time periods. Details of the data structure and how the data structure is created and stored is provided above with respect to Section A.

In some implementations, the content selection module 134 can determine, from the identified keyword clusters, the keyword cluster having the highest relevancy score based on the relevancy scores of the keyword clusters for the given time period corresponding to the length of time between the request to serve content and the time at which the event is scheduled to occur.

The content selection module 134 can select third-party content items based on the keyword cluster having the highest relevancy score for the given time period associated with the request. In some implementations, the content selection module 134 can identify, via an auction associated with the keyword cluster, a third-party content item for selection. Accordingly, the content selection module 134 can select, based on the given time period corresponding to the length of time between the request to serve content and the time at which the event is scheduled to occur and the event category associated with the event, content for display. In some implementations, the content selection module 134 can identify, from the keyword cluster, one or more keywords of the keyword cluster that may be most relevant to the identifier associated with the device on which to serve the content. The content selection module 134 can then select, based on an auction to serve content for the identified keywords, third-party content for display.

The content selection module 134 can then provide the selected content for display at a computing device associated with the device identifier. In some implementations, the content selection module 134 can provide the selected content for display in a content slot of an information resource. In some implementations, the content is selected based on an auction to serve content in the content slot of the information resource.

Figure 5A:
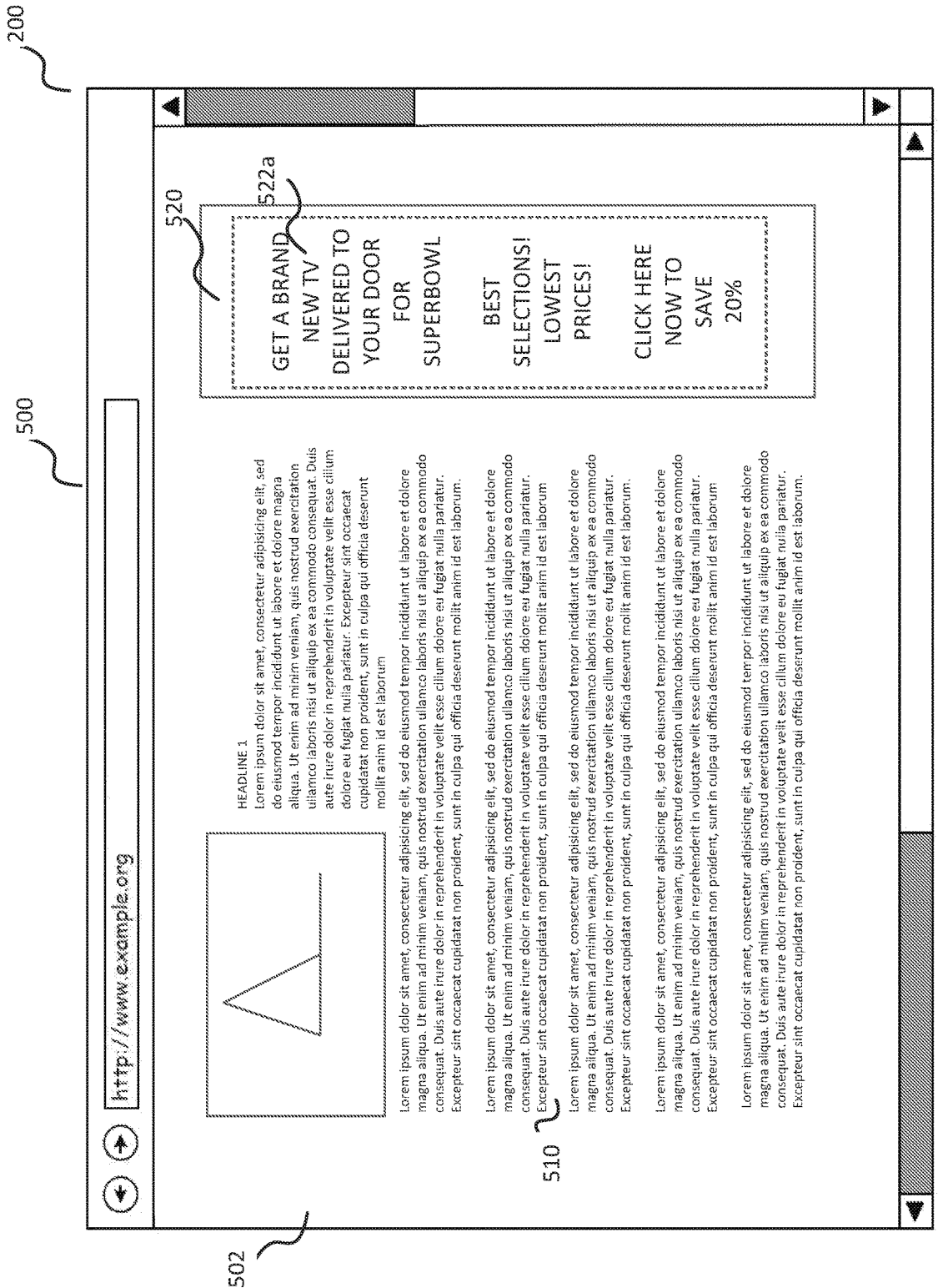
FIG. 5A shows a conceptual illustration of an example of a third-party content item related to the calendar entry provided for display on an information resource at a first time duration from the event of FIG. 2.

FIG. 5A shows a conceptual illustration of a display of a computing device including an information resource at a first time period corresponding to a length of time between a request to serve content and a time at which an event associated with the computing device is scheduled to occur. The display 500 includes an information resource 502 that includes primary content 510 and a content slot 520 for containing third-party content items, such as third-party content item 522a.

A user associated with the computing device on which the information resource 502 is displayed may request content. In some implementations, the user may submit a request to access the information resource corresponding to a particular domain. The data processing system 110, or in particular, the content selection module 134 may receive the request from the computing device. The content selection module 134 may identify an identifier associated with the request, such as a device identifier associated with the computing device. The content selection module 134 can use the identified identifier to determine one or more events included in a calendar associated with the identifier. In some implementations, the content selection module 134 may identify one or more calendars associated with the identifier. The content selection module 134 may then identify, from each of the calendars, one or more calendar entries corresponding to events. For each of the events, the content selection module 134 can identify an importance score of the event. As described above with respect to Section A, the importance score can be determined based on the contents of the event and historical data associated with events similar to the event for which the importance score is being determined. The content selection module 134 can then select an event based on the importance scores of one or more events for which to serve content.

The content selection module 134 can then identify a keyword cluster associated with the event for which content is to be served. The content selection module 134 can identify the keyword cluster by selecting the keyword cluster from a plurality of keyword clusters associated with the event. In some implementations, the content selection module 134 can identify the keyword clusters by performing a lookup in a database to identify a data structure created by the event parsing module 130 or the relevancy score generation module 132. The data structure may be created for the identified event and may include a plurality of keyword clusters associated with the event. In some implementations, the event parsing module 130 or the relevancy score generation module 132 may create one or more data structures for event categories to which events may correspond. In this way, the event parsing module 130 or the relevancy score generation module 132 do not need to create a data structure for each event for which content may be served. Rather, the event parsing module 130 or the relevancy score generation module 132 may create data structures for a predetermined number of event categories and select an event category with which the event is closely related.

The content selection module 134 may select, from the plurality of identified keyword clusters included in the data structure to which the event corresponds, a keyword cluster for selecting content to serve. As described above with respect to section A, each keyword cluster—event pair or keyword cluster—event category pair can be associated with one or more relevancy scores. Each keyword cluster—event pair can have a first relevancy score for a first time period corresponding to a first length of time between the request to serve content and the time at which the event is scheduled to occur, a second relevancy score for a second time period corresponding to a second length of time between the request to serve content and the time at which the event is scheduled to occur, and so on. The content selection module 134 can determine, from the time at which the request to serve content is received and the time at which the event is scheduled to occur and, a length of time between the time between the request to serve content and the time at which the event is scheduled to occur. From the determined length of time, the content selection module 134 can determine a time period to which the determined length of time corresponds. Based on the determined time period, the content selection module 134 can determine the relevancy scores of the plurality of keyword clusters corresponding to the determined time period. In some implementations, the content selection module 134 can select one of the keyword clusters based on the relevancy scores. In some implementations, the content selection module 134 can select the keyword cluster having the highest relevancy score for the determined time period.

The content selection module 134 can then select third-party content corresponding to the selected keyword cluster. In some implementations, the content selection module 134 can select the third-party content via an auction. In some implementations, multiple advertisers can place bids to serve third-party content in the auction. In some implementations, one of the auction parameters can be the keyword cluster or a keyword from the keyword cluster. In some implementations, the auction parameters may further include information associated with the identifier. In some implementations, the content selection module 134 may select the third-party content based on a winning bid of the auction for the keyword cluster.

The content selection module 134 may then provide the selected third-party content for display on the information resource. In some implementations, the content selection module 134 may provide the third-party content to the content publisher that publishes the information resource associated with the request to serve content. In some implementations, the content selection module 134 may provide the third-party content to the computing device associated with the request. The third-party content can be modified to fit within a content slot included in the information resource.

The display of FIG. 5A shows a third-party content item 522a that corresponds to the calendar entry 200 shown in FIG. 2. The calendar entry 200 relates to John's Superbowl party. The display of FIG. 5A can correspond to John's computing device. When John requests to access the information resource, the content selection module 134 receives a request to serve content to the display of John's computing device. The data processing system 110 may determine that John supports a particular sports team, will be serving pizza and wine and as the event is located at his house, he may be interested in purchasing a new TV, as search queries for TVs increase weeks before the Superbowl.

The data processing system 110 has created a data structure for the event and has identified that the keyword cluster 'HDTV' has the highest relevancy score for a first time period, the keyword cluster 'Pizza' has the highest relevancy score for a second time period and the keyword cluster 'sports apparel' has the highest relevancy score for a third time period. The first time period can correspond to any time between 2 to 4 weeks prior to the Superbowl, the second time period can correspond to any time between 1 week prior to the Superbowl to the time the Superbowl starts and the third time period can correspond to any time between the end of the Superbowl and 1 week after the Superbowl ends.

Figure 5B:
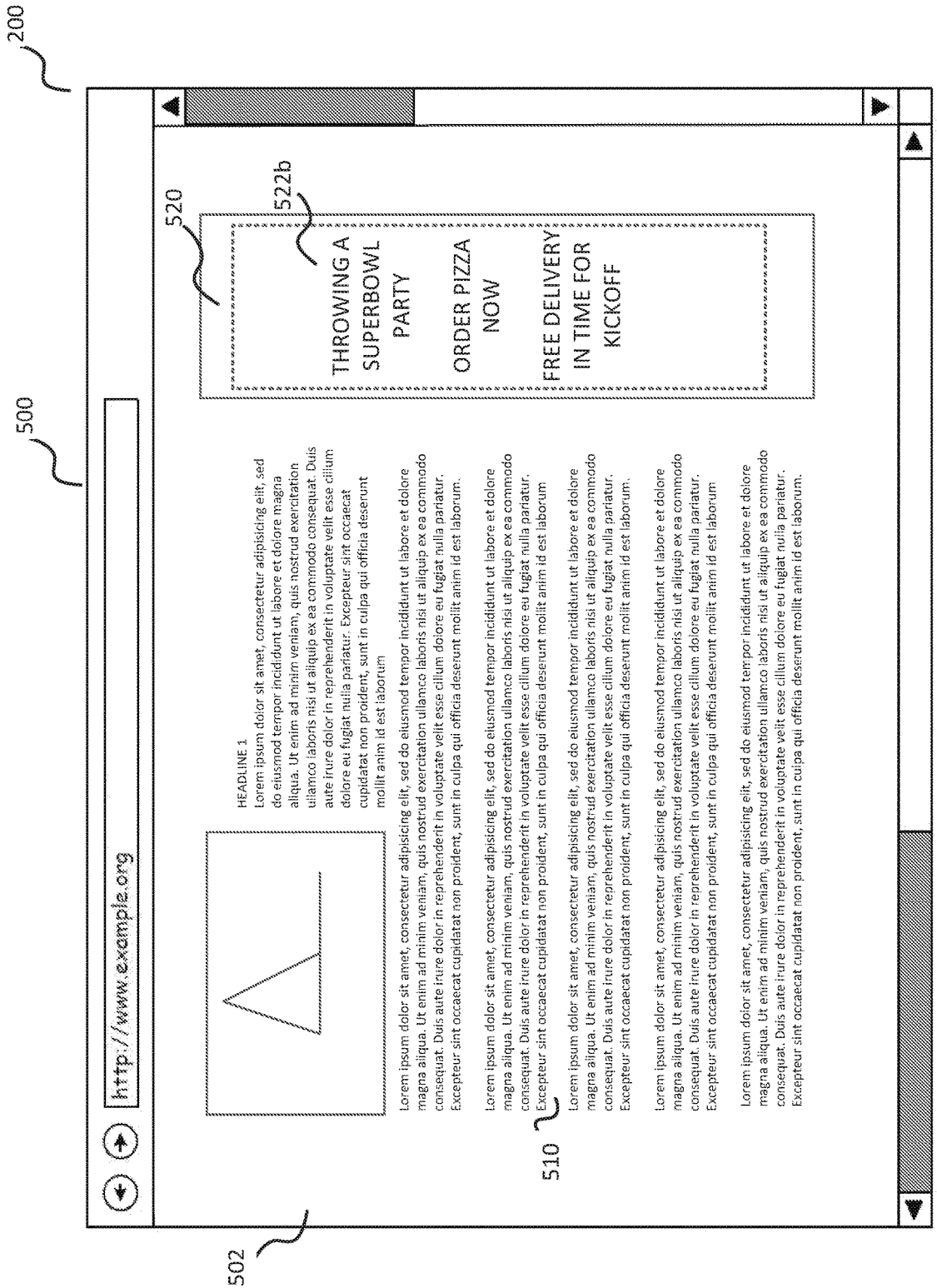
FIG. 5B shows a conceptual illustration of an example of a third-party content item related to the calendar entry provided for display on an information resource at a second time duration from the event of FIG. 2.
Figure 5C:
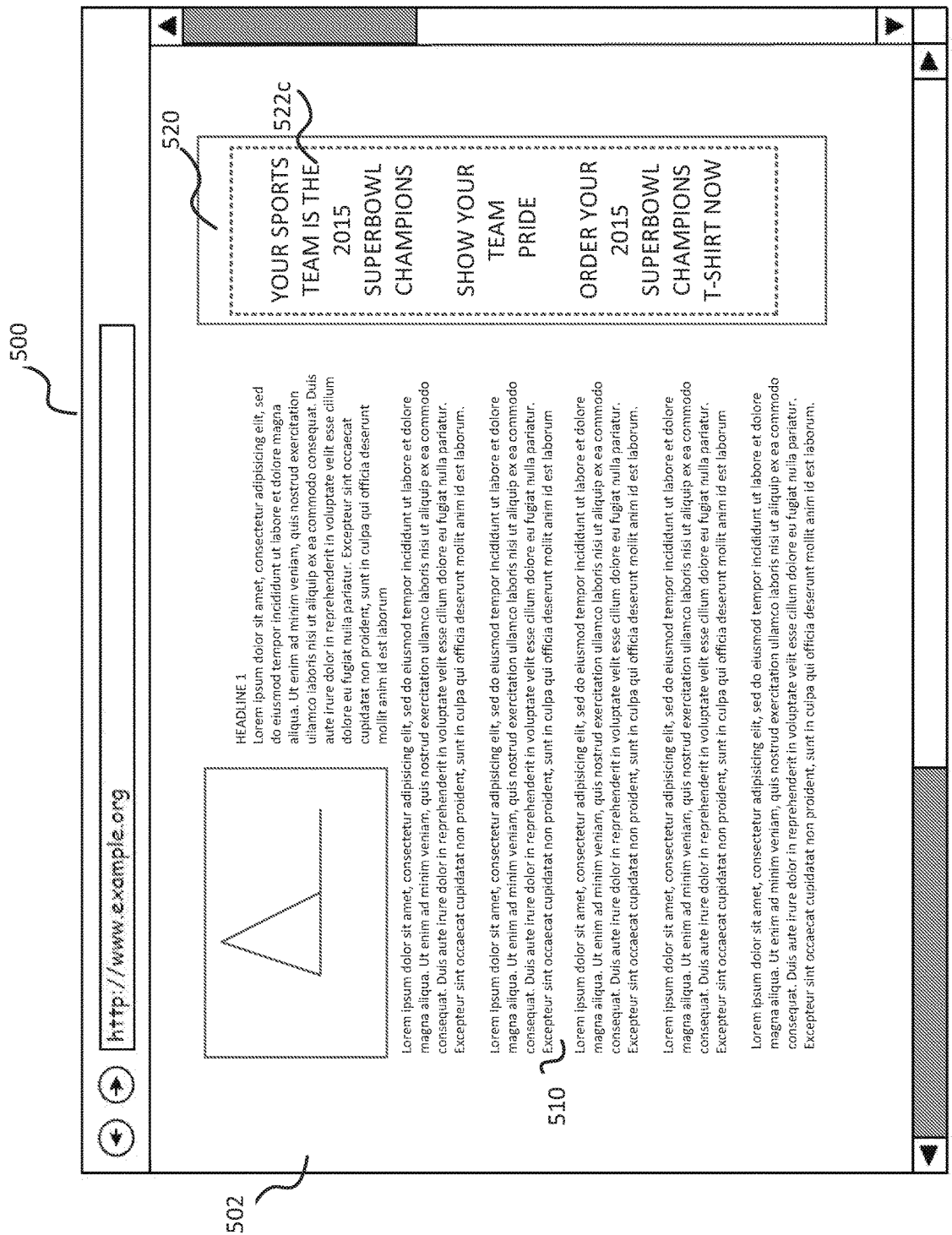
FIG. 5C shows a conceptual illustration of an example of a third-party content item related to the calendar entry provided for display on an information resource at a third time duration from the event of FIG. 2.

Accordingly, the information resource of FIG. 5A is displayed with a third-party content item 522a that relates to HDTV. FIG. 5B shows a conceptual illustration of a display of a computing device including an information resource at a second time period corresponding to a length of time between a request to serve content and a time at which an event associated with the computing device is scheduled to occur. The information resource of FIG. 5B is displayed with a third-party content item 522b that relates to Pizza. FIG. 5C shows a conceptual illustration of a display of a computing device including an information resource at a third time period corresponding to a length of time between a request to serve content and a time at which an event associated with the computing device is scheduled to occur. The information resource of FIG. 5C is displayed with a third-party content item 522c that relates to sports apparel.

Figure 6:
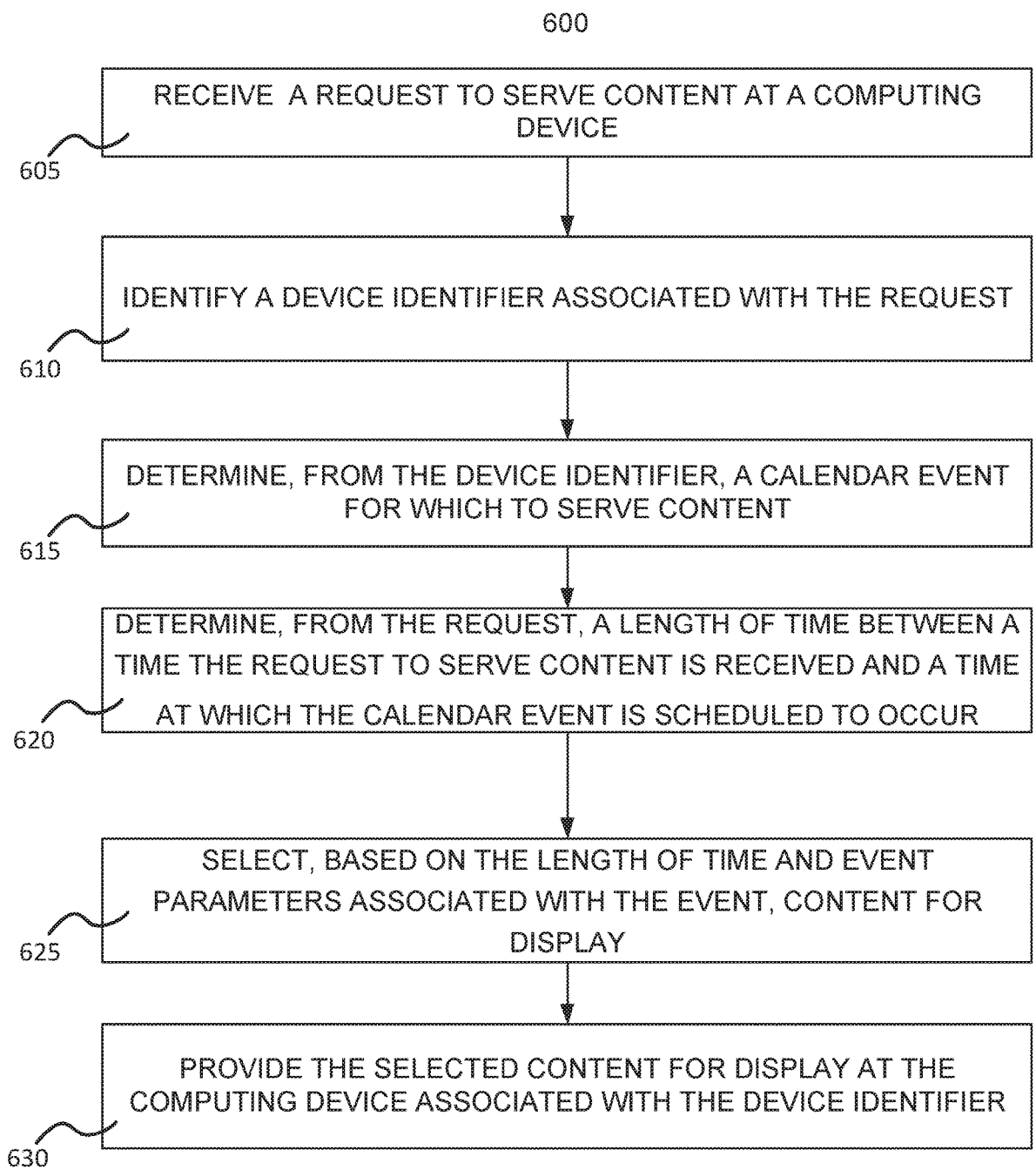
FIG. 6 is a flow diagram depicting one implementation of selecting content for display based on event related information of an event and a time duration from the event.

FIG. 6 is a flow diagram depicting one implementation of the steps taken to selecting third-party content for a device based on calendar events of a user associated with the device and a length of time between the time third-party content is to be served and the time at which the event is scheduled to occur. In particular, FIG. 6 illustrates a flow diagram depicting a method 600 for selecting third-party content for a device based on calendar events of a user associated with the device and a length of time between the time third-party content is to be served and the time at which the event is scheduled to occur. One or more processors can receive a request to serve content at a computing device (BLOCK 605). The processors can identify a device identifier associated with the computing device (BLOCK 610). The processors can determine, from the device identifier, a calendar event for which to serve content (BLOCK 615). The processors can determine, from the request, a length of time between a time the request to serve content is received and a time at which the event is scheduled to occur (BLOCK 620). The processors can select, by the one or more processors, based on the determined length of time and event parameters associated with the calendar event, content for display (BLOCK 625). The processors can provide the selected content for display at the computing device associated with the device identifier (BLOCK 630).

In further detail, the one or more processors can receive a request to serve content (BLOCK 605). In some implementations, the processors can receive a request to serve content on a computing device. In some implementations, the processors can receive a request to serve third-party content. In some implementations, the processors can receive a request to serve content in response to a device requesting access to an information resource. The processors can receive a request to serve third-party content in one or more content slots of an information resource when the information resource is rendered for display on the computing device.

The processors can identify a device identifier associated with the request (BLOCK 610). In some implementations, the processors can identify an identifier associated with the device on which to serve content. In some implementations, the identifier can be associated with a user of the device. In some implementations, the identifier can be associated with one or more applications, including a mail application, a calendar application, a social networking application, among others.

The processors can determine, from the device identifier, a calendar event for which to serve content (BLOCK 615). In some implementations, the processors can determine, based on the identifier, a calendar including one or more calendar events associated with the identifier. In some implementations, the processors may identify one or more calendars associated with the identifier. The processors may then identify, from each of the calendars, one or more calendar entries corresponding to calendar events. For each of the events, the processors can identify an importance score of the event.

The importance score can indicate a measure of how likely a user associated with the identifier is to be influenced by third-party content related to the event. The importance score can be determined based on one or more event parameters associated with the event. In some implementations, the processors may already have analyzed each of the calendar entries and determined and assigned an importance score to each of the events. The process of determining an importance score may be performed in an offline process for each identifier associated with a calendar including one or more events. The importance score can be influenced by various factors including the type of event, the invitees of the event, the role of the user in the event, the number of attendees or invitees, the venue of the event, among others. The importance score can be determined based on the contents of the event and historical data associated with events similar to the event for which the importance score is being determined.

The processors can select, from a plurality of identified events associated with the identifier, a calendar event based on which to serve content. In some implementations, the processors can select a calendar event from the plurality of identified calendar events based on the importance score for each of the identified events. Certain events, for example, a graduation may have a much higher importance score than a Superbowl watch party. The processors may use heuristics to assign importance scores to various events. In some implementations, the processors may look at the performance of third-party content items related to topics associated with the events to determine an importance score. In some implementations, the processors may look at search query volume or other network activity to determine importance scores for various events. In some implementations, the processors may attribute a certain portion of the importance score to certain events based on various other criteria. In some implementations, the processors can select a calendar event from a calendar of the device identifier that has been created by a user associated with the device identifier. Stated in another way, the processors can determine a calendar event from a calendar in which the user is the host, organizer or creator of the calendar event.

The processors can determine, from the request, a length of time between a time the request to serve content is received and a time at which the event is scheduled to occur (BLOCK 620). In some implementations, the processors may identify a time at which an event is scheduled to occur. To do so, the processors may parse the calendar entry to identify the time (the time can include both the date and the time) at which the event is scheduled to occur. In some implementations, the processors may identify a time at which an event is scheduled to occur as described above with respect to section A. The processors may determine a time at which the request to serve content is received. The processors may determine a length of time from the time at which the request to serve content is received and the time at which the event is scheduled to occur.

In some implementations, the processors can determine, from the length of time from the time at which the request to serve content is received and the time at which the event is scheduled to occur, a predetermined time period from the event to which the length of time corresponds. In some implementations, the processors may define predetermined time periods corresponding to the time at which the event is scheduled to occur. The granularity of predetermined time periods can vary based on the event. In some implementations, the time periods can extend from seconds to minutes to hours to days to weeks and even months. Details regarding time periods and how they are generated and selected are described above with respect to Section A.

The processors can also determine one or more event parameters associated with the event. In some implementations, the processors can determine an event category to which the event corresponds based on the determined event parameters. Details regarding determining event parameters and event categories are provided above with respect to Section A.

The processors can select, by the one or more processors, based on the determined length of time and event parameters associated with the event, content for display (BLOCK 625). In some implementations, the processors can determine, from the event parameters or categories associated with the event and the length of time between the time the request to serve content is received and the time at which the event is scheduled to occur, one or more keyword clusters associated with the event categories associated with the event. The processors may be configured to determine the keywords by performing a lookup in a data structure including keyword clusters associated with the event or event category to which the identified event corresponds. In some implementations, the processors can identify, using the event category to which the event is most closely related, one or more keyword clusters associated with the event category.

In some implementations, the processors can determine, for each of the identified keyword clusters associated with the event, relevancy scores associated with each of the keyword clusters for the given time period corresponding to the length of time between the request to serve content and the time at which the event is scheduled to occur. The data structure associated with the event can include relevancy scores for each keyword cluster for each of a plurality of time periods. Details of the data structure and how the data structure is created and stored is provided above with respect to Section A.

In some implementations, the processors can determine, from the identified keyword clusters, the keyword cluster having the highest relevancy score based on the relevancy scores of the keyword clusters for the given time period corresponding to the length of time between the request to serve content and the time at which the event is scheduled to occur.

The processors can select third-party content items based on the keyword cluster having the highest relevancy score for the given time period associated with the request. In some implementations, the processors can identify, via an auction associated with the keyword cluster, a third-party content item for selection. Accordingly, the processors can select, based on the given time period corresponding to the length of time between the request to serve content and the time at which the event is scheduled to occur and the event category associated with the event, content for display. In some implementations, the processors can identify, from the keyword cluster, one or more keywords of the keyword cluster that may be relevant to the identifier associated with the device on which to serve the content. The processors can then select, based on an auction to serve content for the identified keywords, third-party content for display.

The processors can provide the selected content for display at a computing device associated with the device identifier (BLOCK 630). In some implementations, the processors can provide the selected content for display in a content slot of an information resource. In some implementations, the processors select the content based on an auction to serve content in the content slot of the information resource.

C. Adjusting Relevancy Scores for a Given Keyword Cluster—Time Period—Event Category Combination Based on the Performance of Third-Party Content The present disclosure also provides methods, apparatus and systems to adjust relevancy scores for a given keyword cluster—time period—event category combination based on the performance of third-party content. To do so, the data processing system can analyze the historical performance of third-party content.

The relevancy score adjustment module 136 can include combinations of software and hardware, such as one or more processors configured to execute one or more scripts to identify an event category associated with one or more relevancy scores, identify, from a content serving opportunity log, a plurality of content serving opportunities associated with the event category in which content served in the content serving opportunity is selected based on a keyword cluster associated with the event category, determine, for each of the identified content serving opportunities, an event for which content was served in the content serving opportunity, identify, for each of the identified content serving opportunities, a time period corresponding to a length of time between a time the content of the content serving opportunity was provided for display and a time at which the event was scheduled to occur, determine, for each of the identified content serving opportunities, a keyword cluster that effected a selection of the content provided for display, identify, from the plurality of content serving opportunities, a subset of content serving opportunities, each of the subset of content serving opportunities corresponds to the identified event category and corresponds to a particular time period as other content serving opportunities of the subset, determine, for each of the subset of content serving opportunities, a performance of the content associated with the subset of content serving opportunities that is provided for display and adjust a relevancy score of a keyword cluster—time period—event category combination based on the performance of the content of the subset of content serving opportunities, for instance.

The relevancy score adjustment module 136 can identify an event category of a keyword cluster-time period-event category combination. In some implementations, the relevancy score adjustment module 136 can identify a keyword cluster—time period—event category combination in response to a request. In some implementations, the relevancy score adjustment module 136 may identify the keyword cluster—time period—event category combination to monitor and adjust a relevancy score of the keyword cluster—time period—event category combination. In some implementations, the relevancy score adjustment module 136 may periodically monitor relevancy scores of keyword cluster—time period—event category combinations previously generated by the relevancy score generation module 136. Details of how the keyword cluster—time period—event category combination is generated are provided with respect to section A.

The relevancy score adjustment module 136 can identify, from a content serving opportunity log, a plurality of content serving opportunities associated with the event category in which content served in the content serving opportunity is selected based on a keyword cluster associated with the event category. The event parsing module or another module of the data processing system 110 may create and maintain a content serving opportunity log, such as the content serving opportunity log shown in FIG. 3C. The content serving opportunity log identifies each third-party content item that is provided for display. In some implementations, an advertising auction system may maintain the content serving opportunity log. In some implementations, the content serving opportunity log may only include content serving opportunities that occurred over a predetermined time period, for example, a year, a month, a week, a day, among others. In some implementations, the relevancy score adjustment module 136 may apply filters to select, from the content serving opportunities log, only those content serving opportunities that occurred within a particular time frame.

For example, the relevancy score adjustment module 136 may adjust relevancy scores every month. As such, in some implementations, the relevancy score adjustment module 136 can select content serving opportunities that occurred over the last month.

In some implementations, for each selected content serving opportunity, the event parsing module 130 can identify, from the identifier associated with the content serving opportunity, if an event included in a calendar associated with the identifier may be related to the content item served in the content serving opportunity. To do so, the event parsing module 130 can determine the keyword or keyword cluster on which the advertiser associated with the content item placed a bid that resulted in the content item being selected for display. From the determined keyword cluster, the event parsing module 130 can determine a list of candidate event categories associated with the keyword cluster. The event parsing module 130 can then determine, from the list of candidate event categories, events in the calendars associated with the identifier related to any of the candidate event categories and attribute the content serving opportunity to the identified events.

The relevancy score adjustment module 136 can determine, for each of the identified content serving opportunities, an event for which content was served in the content serving opportunity. In some implementations, for each content serving opportunity, the relevancy score adjustment module 136 can identify, from the identifier associated with the content serving opportunity, if an event included in a calendar associated with the identifier may be related to the content item served in the content serving opportunity. To do so, the relevancy score adjustment module 136 can determine the keyword or keyword cluster on which the advertiser associated with the content item placed a bid that resulted in the content item being selected for display. From the determined keyword cluster, the relevancy score adjustment module 136 can determine a list of candidate event categories associated with the keyword cluster. The relevancy score adjustment module 136 can then determine, from the list of candidate event categories, events in the calendars associated with the identifier related to any of the candidate event categories and attribute the content serving opportunity to the identified events.

The relevancy score adjustment module 136 can identify, for each of the events for which content was served in the content serving opportunity, a time period corresponding to a length of time between a time the content of the content serving opportunity was provided for display and a time at which the event was scheduled to occur. The relevancy score adjustment module 136 can determine a time at which the event is scheduled to occur and a time at which the content serving opportunity occurs. The relevancy score adjustment module 136 can determine, from the time at which the event is scheduled to occur and the time at which the content serving opportunity occurs, a length of time corresponding to the difference in the two times. The length of time can correspond to one or more predetermined time periods. For example, the length of time shown in FIG. 3C for the content serving opportunity CS1 may correspond to a first time period that extends between 2 weeks prior to the event and 1 week prior to the event, while the length of time shown in FIG. 3C for the content serving opportunity CS5 may correspond to a second time period that extends between 1 week prior to the event and the start time of the event. In some implementations, the event parsing module 130 or the relevancy score generation module 132 can determine the time period to which the content serving opportunity corresponds based on the time at which the content serving opportunity occurred relative to the time at which the event is scheduled to occur.

The relevancy score adjustment module 136 can determine, for each of the identified content serving opportunities, a keyword cluster that effected a selection of the content provided for display. In some implementations, the relevancy score adjustment module 136 can determine the keyword cluster based on an auction for selecting the content item selected for display for the given content serving opportunity. In some implementations, one or more third-party content providers can submit bids on keywords or keyword clusters to serve content. In some implementations, the content selected for display is selected based on a bid value submitted by the third-party content provider on the keyword or keyword cluster. In some implementations, the keyword or keyword cluster on which third-party content providers bid may be different from the keyword clusters associated with the event categories. However, through semantic analysis, the relevancy score adjustment module 136 can determine the keyword cluster associated with the event category that is closely related to the keyword or keyword cluster on which the winning bid was placed.

The relevancy score adjustment module 136 can identify, from the plurality of content serving opportunities, a subset of content serving opportunities that correspond to the identified event category, a keyword cluster associated with the event category and to a particular time period. For instance, the relevancy score adjustment module 136 can identify all content serving opportunities corresponding to the keyword cluster 'swimwear,' event category 'Atlantis' and the first time period extending between two weeks prior to the event and one week prior to the event. In some implementations, the relevancy score adjustment module 136 can identify subsets for each possible time period for content serving opportunities that correspond to the event category and the keyword cluster.

The relevancy score adjustment module 136 can determine, for each of the subset of content serving opportunities that correspond to the identified event category, a keyword cluster associated with the event category and to a particular time period, a performance of the content associated with the subset of content serving opportunities that is provided for display. In some implementations, the relevancy score adjustment module 136 can determine the performance of the content from the content serving opportunity log. In some implementations, the performance of the content can be based on conversions. In some implementations, a conversion may correspond to an action taken on the content, for example, a click through, a submission of information, a response to a poll, a purchase made via the content, among others.

The relevancy score adjustment module 136 can adjust a relevancy score of a keyword cluster—time period—event category combination based on the performance of the content of the subset of content serving opportunities. In some implementations, the relevancy score adjustment module 136 can first identify a current relevancy score associated with the keyword cluster—time period—event category combination. In some implementations, the data structure created for the event category can include the relevancy scores for each keyword cluster associated with the event category and for a plurality of predetermined time periods. The relevancy score adjustment module 136 can then determine the performance of the content items associated with the subset of content serving opportunities that are provided for display. As described above with respect to section A, to determine a relevancy score for a keyword cluster—time period—event category combination, the relevancy score generation module 132 or the relevancy score adjustment module 136 can determine a performance of the subset of content serving opportunities to determine a relevancy score based on the identified content serving opportunities. In some implementations, the relevancy score adjustment module 136 can determine the relevancy score of the keyword cluster—time period—event category combination based on a conversion rate of the subset of content serving opportunities. In some implementations, conversion rates can be determined based on click throughs, sales, or other performance metrics. In this way, the relevancy score adjustment module 136 can determine the relevancy score of any keyword cluster—time period—event category combination. In some implementations, the performance can be based on the ratio of the identified content serving opportunities in which a conversion occurred relative to the total number of identified content serving opportunities.

In some implementations, the relevancy score adjustment module 136 can then replace the relevancy score generated by the relevancy score adjustment module 136 for the keyword cluster—time period—event category combination with a previous relevancy score for the keyword cluster—time period—event category combination. The relevancy score adjustment module 136 may then identify, for each time period—event category combination, which keyword cluster has the highest relevancy score. In this way, when a request to serve content associated with a given time period—event category combination is received, the content selection module 134 can identify a keyword cluster based on the adjusted relevancy score for the time period—event category combination. In some implementations, the keyword cluster with the highest adjusted relevancy score for the time period—event category combination is used to identify a content item for display in response to the request to serve content.

In some implementations, the frequency at which the relevancy score adjustment module 136 calculates and adjusts relevancy scores can vary. In some implementations, the frequency can be time based, such as daily, weekly, monthly and so forth. In some implementations, the frequency can be triggered by an event, for example, if the data processing system 110 determines that the performance of third-party content served for a particular event category is below a threshold. In some such implementations, the relevancy score adjustment module 136 may periodically monitor the performance of third-party content across multiple event categories.

In some implementations, the relevancy score adjustment module 136 may determine that a number of content serving opportunities for the keyword cluster—time period—event category combination has exceeded a threshold since the last time a relevancy score for the keyword cluster—time period—event category combination was generated. In some implementations, the threshold may be predefined. Once the relevancy score adjustment module 136 determines that the number of content serving opportunities for the keyword cluster—time period—event category combination has exceeded the threshold, the relevancy score adjustment module 136 may compute the relevancy score of the keyword cluster—time period—event category combination and adjust the relevancy score of the keyword cluster—time period—event category combination. In some implementations, the relevancy score adjustment module 136 may adjust each possible keyword cluster—time period—event category combination once the relevancy score adjustment module 136 adjusts a relevancy score of any of the possible keyword cluster—time period—event category combination.

In some implementations, the relevancy score adjustment module 136 can adjust the relevancy score of a keyword cluster—time period—event category combination based on other network activity. For instance, the relevancy score adjustment module 136 can adjust the relevancy score of a keyword cluster—time period—event category combination based on search queries. In some implementations, the relevancy score adjustment module 136 can identify, for an identifier associated with an event corresponding to an event category, a plurality of search queries related to one or more keyword clusters associated with the event category. For each search query corresponding to a particular keyword cluster associated with the event category, the relevancy score adjustment module 136 can determine the time period relative to the time at which the event is scheduled to occur at which the search query was submitted. The relevancy score adjustment module 136 may determine, from the search queries that correspond to a particular time period, a relevancy score of a corresponding keyword cluster—time period—event category combination. The relevancy score adjustment module 136 may replace a previously generated or adjusted relevancy score with the determined relevancy score. In some implementations, the relevancy score may be determined based on a combination of search queries, third-party content performance and one or more other factors.

Figure 7:
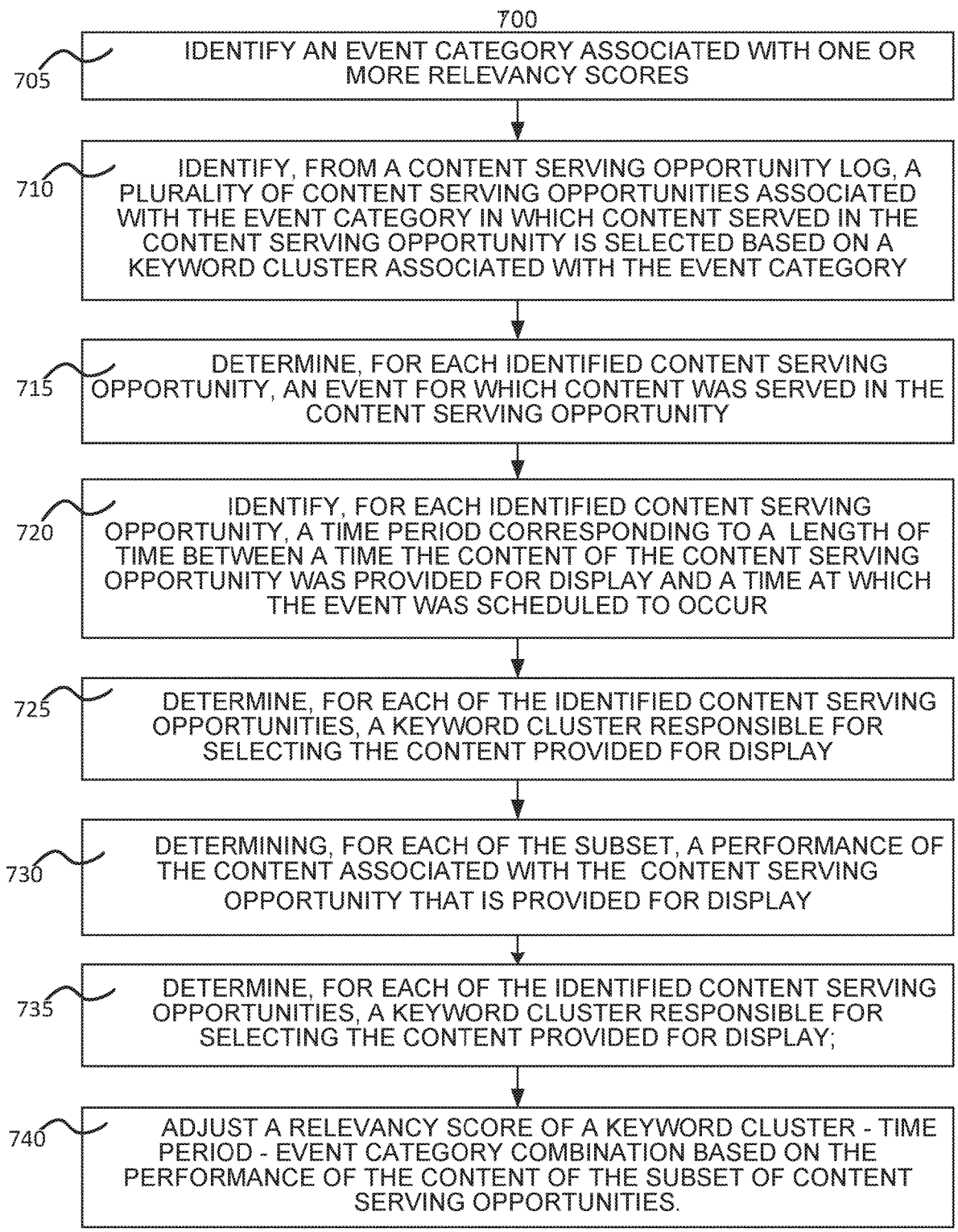
FIG. 7 is a flow diagram depicting one implementation of adjusting a relevancy score of a keyword cluster-event pair based on a time period duration from an event.

FIG. 7 is a flow diagram depicting one implementation of the steps taken to adjust relevancy scores for a given keyword cluster—time period—event category combination. In particular, FIG. 7 illustrates a flow diagram depicting a method 700 for adjusting relevancy scores for a given keyword cluster—time period—event category combination. One or more processors can identify an event category associated with one or more relevancy scores (BLOCK 705). The processors can identify, from a content serving opportunity log, a plurality of content serving opportunities associated with the event category in which content served in the content serving opportunity is selected based on a keyword cluster associated with the event category (BLOCK 710). The processors can determine, for each of the identified content serving opportunities, an event for which content was served in the content serving opportunity (BLOCK 715). The processors can identify, for each of the identified content serving opportunities, a time period corresponding to a length of time between a time the content of the content serving opportunity was provided for display and a time at which the event was scheduled to occur (BLOCK 720). The processors can determine, for each of the identified content serving opportunities, a keyword cluster that effected a selection of the content provided for display (BLOCK 725). The processors can identify, from the plurality of content serving opportunities, a subset of content serving opportunities, each of the subset of content serving opportunities corresponds to the identified event category and corresponds to a particular time period (BLOCK 730). The processors can determine, for each of the subset of content serving opportunities, a performance of the content associated with the subset of content serving opportunities that is provided for display (BLOCK 735). The processors can adjust a relevancy score of the keyword cluster—time period—event category combination based on the performance of the content of the subset of content serving opportunities, for instance. (BLOCK 740). In some implementations, the processors can select, for display, content corresponding to the keyword cluster based on the adjusted relevancy score of the keyword cluster—time period—event category combination.

In further detail, the one or more processors can identify an event category associated with one or more relevancy scores (BLOCK 705). In some implementations, the processors can identify a keyword cluster—time period—event category combination in response to a request. In some implementations, the processors may identify the keyword cluster—time period—event category combination to monitor and adjust a relevancy score of the keyword cluster—time period—event category combination. In some implementations, the processors may periodically monitor relevancy scores of one or more keyword cluster—time period—event category combinations previously generated by the processors.

The processors can identify, from a content serving opportunity log, a plurality of content serving opportunities associated with the event category in which content served in the content serving opportunity is selected based on a keyword cluster associated with the event category (BLOCK 710). The event parsing module or another module of the data processing system 110 may create and maintain a content serving opportunity log, such as the content serving opportunity log shown in FIG. 3C. The content serving opportunity log identifies each third-party content item that is provided for display. In some implementations, an advertising auction system may maintain the content serving opportunity log. In some implementations, the content serving opportunity log may only include content serving opportunities that occurred over a predetermined time period, for example, a year, a month, a week, a day, among others. In some implementations, the processors may apply filters to select, from the content serving opportunities log, only those content serving opportunities that occurred within a particular time frame. For example, the processors may adjust relevancy scores every month. As such, in some implementations, the processors can select content serving opportunities that occurred over the last month.

In some implementations, for each of the selected content serving opportunities, the processors can identify, from the identifier associated with the content serving opportunity, if an event included in a calendar associated with the identifier may be related to the content item served in the content serving opportunity. To do so, the processors can determine the keyword or keyword cluster on which the advertiser associated with the content item placed a bid that resulted in the content item being selected for display. From the determined keyword cluster, the processors can determine a list of candidate event categories associated with the keyword cluster. The processors can then determine, from the list of candidate event categories, events in the calendars associated with the identifier related to any of the candidate event categories and attribute the content serving opportunity to the identified events.

The processors can determine, for each of the identified content serving opportunities, an event for which content was served in the content serving opportunity (BLOCK 715). In some implementations, for each content serving opportunity, the processors can identify, from the identifier associated with the content serving opportunity, if an event included in a calendar associated with the identifier may be related to the content item served in the content serving opportunity. To do so, the processors can determine the keyword or keyword cluster on which the advertiser associated with the content item placed a bid that resulted in the content item being selected for display. From the determined keyword cluster, the processors can determine a list of candidate event categories associated with the keyword cluster. The processors can then determine, from the list of candidate event categories, events in the calendars associated with the identifier related to any of the candidate event categories and attribute the content serving opportunity to the identified events.

The processors can identify, for each of the identified content serving opportunities, a time period corresponding to a length of time between a time the content of the content serving opportunity was provided for display and a time at which the event was scheduled to occur (BLOCK 720). The processors can determine a time at which the event is scheduled to occur and a time at which the content serving opportunity occurs. The processors can determine, from the time at which the event is scheduled to occur and the time at which the content serving opportunity occurs, a length of time corresponding to the difference in the two times. The length of time can correspond to one or more predetermined time periods. For example, the length of time shown in FIG. 3C for the content serving opportunity CS1 may correspond to a first time period that extends between 2 weeks prior to the event and 1 week prior to the event, while the length of time shown in FIG. 3C for the content serving opportunity CS5 may correspond to a second time period that extends between 1 week prior to the event and the start time of the event. In some implementations, the processors can determine the time period to which the content serving opportunity corresponds based on the time at which the content serving opportunity occurred relative to the time at which the event is scheduled to occur.

The processors can determine, for each of the identified content serving opportunities, a keyword cluster that effected a selection of the content provided for display (BLOCK 725). In some implementations, the processors can determine the keyword cluster based on an auction for selecting the content item selected for display for the given content serving opportunity. In some implementations, one or more third-party content providers can submit bids on keywords or keyword clusters to serve content. In some implementations, the content selected for display is selected based on a bid value submitted by the third-party content provider on the keyword or keyword cluster. In some implementations, the keyword or keyword cluster on which third-party content providers bid may be different from the keyword clusters associated with the event categories. However, through semantic analysis or other known techniques, the processors can determine the keyword cluster associated with the event category that is closely related to the keyword or keyword cluster on which the bid associated with the content selected for display was placed.

The processors can identify, from the plurality of content serving opportunities, a subset of content serving opportunities, each of the subset of content serving opportunities corresponds to the identified event category, a particular keyword cluster and a particular time period (BLOCK 730). For instance, the processors can identify all content serving opportunities corresponding to the keyword cluster 'swimwear,' event category 'Atlantis' and the first time period extending between two weeks prior to the event and one week prior to the event. In some implementations, the processors can identify subsets for each possible time period for content serving opportunities that correspond to the event category and the keyword cluster.

The processors can determine, for each of the subset of content serving opportunities, a performance of the content associated with the subset of content serving opportunities that is provided for display (BLOCK 735). The processors can determine, for each of the subset of content serving opportunities that correspond to the identified event category, a keyword cluster associated with the event category and to a particular time period, a performance of the content associated with the subset of content serving opportunities that is provided for display. In some implementations, the processors can determine the performance of the content from the content serving opportunity log. In some implementations, the performance of the content can be based on conversions. In some implementations, a conversion may correspond to an action taken on the content, for example, a click through, a submission of information, a response to a poll, a purchase made via the content, among others.

The processors can adjust a relevancy score of the keyword cluster—time period—event category combination based on the performance of the content of the subset of content serving opportunities. (BLOCK 740). In some implementations, the processors can first identify a current relevancy score associated with the keyword cluster—time period—event category combination. In some implementations, the data structure created for the event category can include the relevancy scores for each keyword cluster associated with the event category and for a plurality of predetermined time periods. The processors can then determine the performance of the content items associated with the subset of content serving opportunities that are provided for display. To determine a relevancy score for a keyword cluster—time period—event category combination, the processors can determine a performance of the subset of content serving opportunities to determine a relevancy score based on the identified content serving opportunities. In some implementations, the processors can determine the relevancy score of the keyword cluster—time period—event category combination based on a conversion rate of the subset of content serving opportunities. In some implementations, conversion rates can be determined based on click throughs, sales generated through the content, or other performance metrics. In this way, the processors can determine the relevancy score of any keyword cluster—time period—event category combination. In some implementations, the performance can be based on the ratio of the identified content serving opportunities in which a conversion occurred relative to the total number of identified content serving opportunities.

In some implementations, the processors can then replace the relevancy score generated by the processors for the keyword cluster—time period—event category combination with a previous relevancy score for the keyword cluster—time period—event category combination. The processors may then identify, for each time period—event category combination, which keyword cluster has the highest relevancy score. In this way, when a request to serve content associated with a given time period—event category combination is received, the processors can identify a keyword cluster based on the adjusted relevancy score for the time period—event category combination. In some implementations, the keyword cluster with the highest adjusted relevancy score for the time period—event category combination is used to identify a content item for display in response to the request to serve content.

In some implementations, the frequency at which the processors calculate and adjust relevancy scores can vary. In some implementations, the frequency can be time based, such as daily, weekly, monthly and so forth. In some implementations, the frequency can be triggered by an event, for example, if the data processing system 110 determines that the performance of third-party content served for a particular event category is below a threshold. In some such implementations, the processors may periodically monitor the performance of third-party content across multiple event categories.

In some implementations, the processors may determine that a number of content serving opportunities for the keyword cluster—time period—event category combination has exceeded a threshold since the last time a relevancy score for the keyword cluster—time period—event category combination was generated. In some implementations, the threshold may be predefined. Once the processors determine that the number of content serving opportunities for the keyword cluster—time period—event category combination has exceeded the threshold, the processors may compute the relevancy score of the keyword cluster—time period—event category combination and adjust the relevancy score of the keyword cluster—time period—event category combination. In some implementations, the processors may adjust each possible keyword cluster—time period—event category combination once the processors adjusts a relevancy score of any of the possible keyword cluster—time period—event category combination.

In some implementations, the processors can adjust the relevancy score of a keyword cluster—time period—event category combination based on other network activity. For instance, the processors can adjust the relevancy score of a keyword cluster—time period—event category combination based on search queries. In some implementations, the processors can identify, for an identifier associated with an event corresponding to an event category, a plurality of search queries related to one or more keyword clusters associated with the event category. For each search query corresponding to a particular keyword cluster associated with the event category, the processors can determine the time period relative to the time at which the event is scheduled to occur at which the search query was submitted. The processors may determine, from the search queries that correspond to a particular time period, a relevancy score of a corresponding keyword cluster—time period—event category combination. The processors may replace a previously generated or adjusted relevancy score with the determined relevancy score. In some implementations, the relevancy score may be determined based on a combination of search queries, third-party content performance and one or more other factors.

In some implementations, the processors can adjust relevancy scores of keyword clusters based on a time period from an event by determining, for an event category, a keyword cluster for serving content, identifying, for the keyword cluster and event category combination, a plurality of content provided for display based on the keyword cluster and the event category, determining, for each of the plurality of content, a time period relative to a corresponding event for which the content was provided for display, determining, for each of the plurality of content, a performance of the content responsive to providing the content for display, aggregating, according to a first time period relative to the corresponding event for which the content was provided for display, the performance of the plurality of content identified for the keyword cluster; and adjusting a relevancy score for the keyword cluster—time period—event category based on the aggregate performance of the plurality of content identified for the keyword cluster and the event type.

In some implementations, the processors can adjust a relevancy score of a keyword cluster—time period—event category combination by identifying, for a keyword cluster—time period—event category combination, a plurality of content serving opportunities in which content items are selected to be served based on i) an event that corresponds to a particular event category, ii) a keyword cluster associated with the particular event category and iii) a length of time between the serving of the content and the time at which the event is scheduled to occur, determining, a performance for each of the served content items corresponding to the keyword cluster—time period—event category combination, aggregating, for the keyword cluster—time period—event category combination, the performance of the served content items and adjusting a relevancy score of the keyword cluster—time period—event category combination based on the aggregate performance of the served content items.

In some implementations, the processors can select, for display, content corresponding to the keyword cluster based on the adjusted relevancy score of the keyword cluster—time period—event category combination. Details of how the processors can select content are provided above with respect to Section B.

Figure 8:
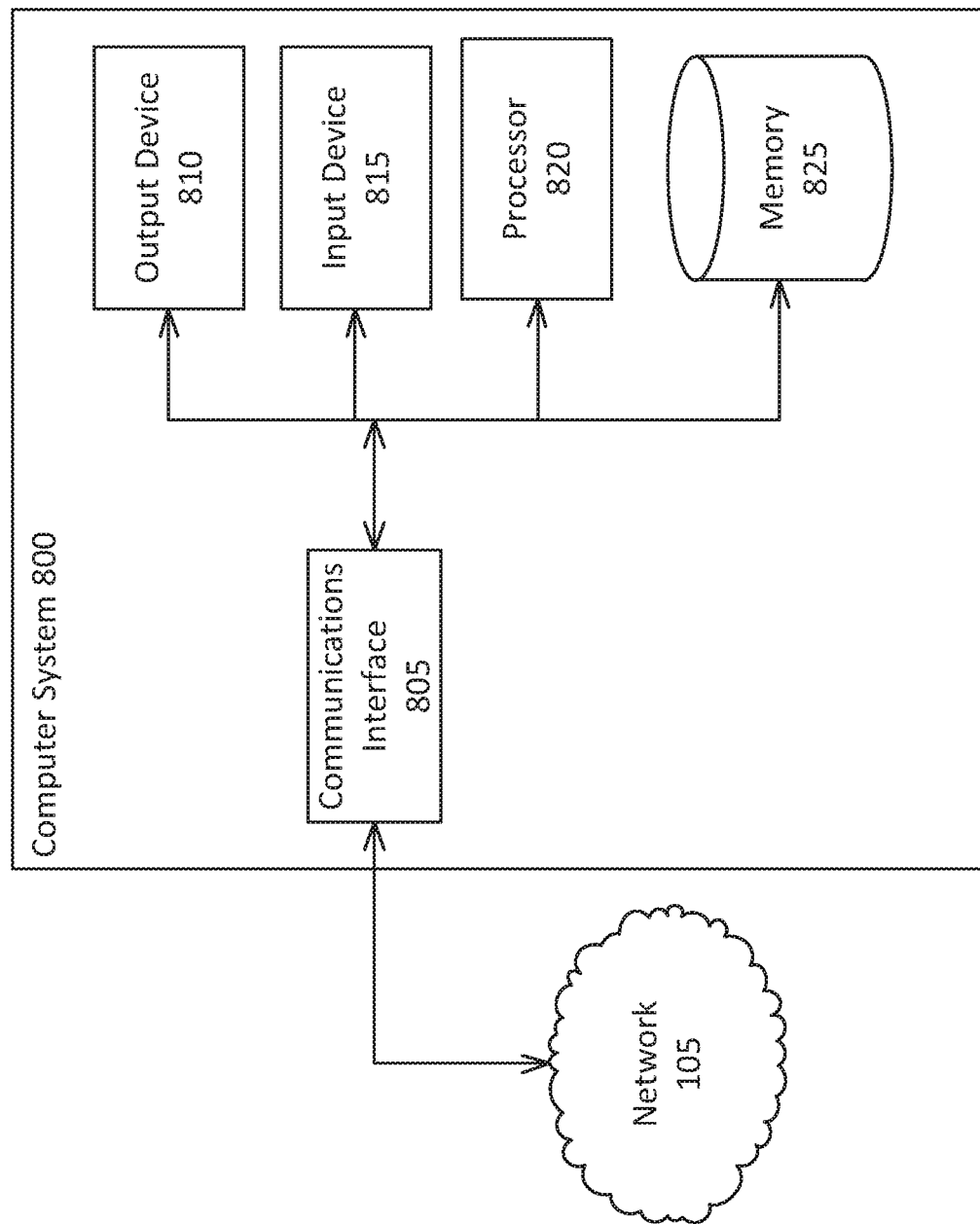
FIG. 8 is a block diagram illustrating an example of an implementation of a general architecture for a computer system that may be employed to implement various elements of the systems and methods described and illustrated herein.

FIG. 8 shows the general architecture of an illustrative computer system 800 that may be employed to implement any of the computer systems discussed herein (including the system 100 and its components such as the event parsing module 130, the relevancy score generation module 132, the content selection module 134 and the relevancy score adjustment module 136) in accordance with some implementations. The computer system 800 can be used to provide information via the network 105 for display. The computer system 800 of FIG. 8 comprises one or more processors 820 communicatively coupled to memory 825, one or more communications interfaces 805, and one or more output devices 810 (e.g., one or more display units) and one or more input devices 815. The processors 820 can be included in the data processing system 110 or the other components of the system 100 such as the event parsing module 130, the relevancy score generation module 132, the content selection module 134 and the relevancy score adjustment module 136.

In the computer system 800 of FIG. 8, the memory 825 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the data processing system 110 can include the memory 825 to store information related to one or events, event categories, calendars associated with identifiers, relevancy scores of keyword cluster—time period—event or event category combinations, importance scores of events, content serving opportunity logs, performance data related to third-party content items, among others. The memory 825 can include the database 140. The processor(s) 820 shown in FIG. 8 may be used to execute instructions stored in the memory 825 and, in so doing, also may read from or write to the memory various information processed and or generated pursuant to execution of the instructions.

The processor 820 of the computer system 800 shown in FIG. 8 also may be communicatively coupled to or control the communications interface(s) 805 to transmit or receive various information pursuant to execution of instructions. For example, the communications interface(s) 805 may be coupled to a wired or wireless network, bus, or other communication means and may therefore allow the computer system 800 to transmit information to or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 800. Examples of communications interfaces 805 include user interfaces (e.g., web pages), through which the user can communicate with the data processing system 110.

The output devices 810 of the computer system 800 shown in FIG. 8 may be provided, for example, to allow various information to be viewed or otherwise perceived in connection with execution of the instructions. The input device(s) 815 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The event parsing module 130, the relevancy score generation module 132, the content selection module 134 and the relevancy score adjustment module 136 can include or share one or more data processing apparatus, computing devices, or processors.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 800 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the event parsing module 130, the relevancy score generation module 132, the content selection module 134 and the relevancy score adjustment module 136 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to identifying elements of a mobile application and automatically inserting content in a mobile application, the systems and methods described herein can be applied to any information resource. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of selecting content in a computer network based on calendar event information, comprising:
   identifying, by a data processing system including one or more processors and a memory, a calendar event associated with a plurality of computing devices;
   selecting, by the data processing system, a set of keyword clusters associated with the calendar event based on online activities performed by the plurality of computing devices;
   determining, by the data processing system, a set of relevancy scores corresponding to the set of keyword clusters associated with the calendar event by generating a relevancy score for each of the set of keyword clusters over a plurality of time periods relative to the calendar event, the relevancy score of a first subset of the set of keyword clusters higher during a first time period than a second time period, and the relevancy score of a second subset of the set of keyword clusters higher during the second time period than the first time period;
   selecting, by the data processing system, content using at least one of the set of relevancy scores; and
   providing, by the data processing system, the content to at least one computing device of the plurality of computing devices associated with the calendar event.

2. The method of claim 1, further comprising:
   extracting, by the data processing system, an event parameter from the calendar event; and
   selecting, by the data processing system, the set of keyword clusters based at least on the event parameter.

3. The method of claim 1, further comprising:
   determining, by the data processing system, from the set of keyword clusters, a keyword cluster with a highest relevancy score; and
   selecting, by the data processing system, content related to the keyword cluster with the highest relevancy score.

4. The method of claim 1, further comprising:
   determining, by the data processing system, a location at which the calendar event is scheduled; and
   identifying, by the data processing system, the set of keyword clusters based at least on the location.

5. The method of claim 1, further comprising:
   determining, by the data processing system, from historical data, performance data of content associated with a keyword cluster related to calendar events similar to the calendar event associated with the plurality of computing devices; and
   selecting, by the data processing system, content based at least on the performance data.

6. The method of claim 1, further comprising:
   receiving, by the data processing system, a request to serve content from at least one of the plurality of computing devices;
   determining, by the data processing system, a length of time between a time the request to serve content is received and a time at which the calendar event is scheduled to occur; and
   determining, by the data processing system, the set of relevancy scores based at least on the length of time.

7. The method of claim 1, further comprising:
   identifying, by the data processing system, a device identifier associated with one of the plurality of computing devices; and
   determining, by the data processing system, from the device identifier, the calendar event.

8. The method of claim 1, further comprising:
   maintaining, by the data processing system, a data structure including the set of keyword clusters in association with an event parameter, and the respective relevancy scores, the set of keyword clusters associated with the calendar event.

9. The method of claim 8, further comprising:
   accessing, by the data processing system, the data structure including the set of keyword clusters associated with the event parameter, and the relevancy scores; and selecting, by the data processing system, from the data structure, a keyword cluster based on the event parameter and the relevancy scores.

10. A system for selecting content in a computer network environment based on calendar event information, comprising:

a data processing system comprising at least one processor and memory, the data processing system configured to:

identify a calendar event associated with a plurality of computing devices;

select a set of keyword clusters associated with the calendar event based on online activities performed by the plurality of computing devices;

determine a set of relevancy scores corresponding to the set of keyword clusters associated with the calendar event by generating a relevancy score for each of the set of keyword clusters over a plurality of time periods relative to the calendar event, the relevancy score of a first subset of the set of keyword clusters higher during a first time period than a second time period, and the relevancy score of a second subset of the set of keyword clusters higher during the second time period than the first time period;

select content using at least one of the set of relevancy scores; and provide the content to at least one computing device of the plurality of computing devices associated with the calendar event.

11. The system of claim 10, wherein the data processing system is further configured to:

extract an event parameter from the calendar event; and
select the set of keyword clusters based at least on the event parameter.

12. The system of claim 10, wherein the data processing system is further configured to:

determine from the set of keyword clusters, a keyword cluster with a highest relevancy score; and
select content related to the keyword cluster with the highest relevancy score.

13. The system of claim 10, wherein the data processing system is further configured to:

determine a location at which the calendar event is scheduled; and
identify the set of keyword clusters based at least on the location.

14. The system of claim 10, wherein the data processing system is further configured to:

determine from historical data, performance data of content associated with a keyword cluster related to calendar events similar to the calendar event associated with the plurality of computing devices; and
select content based at least on the performance data.

15. The system of claim 10, wherein the data processing system is further configured to:

receive a request to serve content from at least one of the plurality of computing devices;
determine a length of time between a time the request to serve content is received and a time at which the calendar event is scheduled to occur; and
determine the set of relevancy scores based at least on the length of time.

16. The system of claim 10, wherein the data processing system is further configured to:

identify a device identifier associated with one of the plurality of computing devices; and
determine, from the device identifier, the calendar event.

17. The system of claim 10, wherein the data processing system is further configured to:

maintain a data structure including the set of keyword clusters in association with an event parameter, and the respective relevancy scores, the set of keyword clusters associated with the calendar event.

18. The system of claim 17, wherein the data processing system is further configured to:

access the data structure including the set of keyword clusters associated with the event parameter, and the relevancy scores; and
select from the data structure, a keyword cluster based on the event parameter and the relevancy scores.

* * * * *